US011893089B1

(12) United States Patent
Begen et al.

(10) Patent No.: US 11,893,089 B1
(45) Date of Patent: Feb. 6, 2024

(54) SYSTEMS AND METHODS FOR PROTECTING CONTENT WHEN USING A GENERAL PURPOSE USER INTERFACE APPLICATION

(71) Applicant: Stamps.com Inc., El Segundo, CA (US)

(72) Inventors: Geoffrey Charles Begen, Lake Forest, CA (US); JP Leon, Marina del Ray, CA (US)

(73) Assignee: Auctane, Inc., Austin, TX (US)

( * ) Notice: Subject to any disclaimer, the term of this patent is extended or adjusted under 35 U.S.C. 154(b) by 784 days.

(21) Appl. No.: 17/062,527

(22) Filed: Oct. 2, 2020

Related U.S. Application Data

(60) Continuation-in-part of application No. 16/422,912, filed on May 24, 2019, now Pat. No. 10,885,153, which is a continuation of application No. 15/630,849, filed on Jun. 22, 2017, now Pat. No. 10,339,280, which is a continuation of application No. 12/103,465, filed on Apr. 15, 2008, now Pat. No. 9,728,107, application No. 17/062,527 is a continuation-in-part of application No. 15/651,893, (Continued)

(51) Int. Cl.
  *G06F 21/10* (2013.01)
  *H04L 9/40* (2022.01)
(52) U.S. Cl.
  CPC .......... *G06F 21/10* (2013.01); *H04L 63/0245* (2013.01); *H04L 63/168* (2013.01)
(58) Field of Classification Search
  CPC ..................................................... G06F 21/10
  See application file for complete search history.

(56) References Cited

U.S. PATENT DOCUMENTS

| 4,325,440 A | 4/1982 | Crowley et al. |
| 4,535,419 A | 8/1985 | Dlugos et al. |

(Continued)

FOREIGN PATENT DOCUMENTS

| EP | 1916628 A1 | 4/2008 |
| WO | WO-2008/049580 A1 | 5/2008 |

OTHER PUBLICATIONS

English translation of WO 2008/049580 to Mayer Oct. 2007.

(Continued)

*Primary Examiner* — Bradley W Holder

(57) ABSTRACT

Systems and methods which prevent or limit access to protected content (e.g., value bearing indicia (VBI)) by a general purpose user interface application (e.g., web browser) are shown. Embodiments implement techniques to avoid displaying protected content by a general purpose user interface application, or displaying protected content during a time in which a user does not have access to particular functions of the general purpose user interface application, to protect the content from various operations, such as repeated printing, electronic copying, etc. Data presentation formatting control in the form of style sheets may be utilized to control access to content. Additionally or alternatively, executable code or an executable object may be implemented within a page or other content to control access to content. Similarly, separate areas, such as windows or pages, may be utilized to control access to content.

6 Claims, 16 Drawing Sheets

Related U.S. Application Data filed on Jul. 17, 2017, now abandoned, which is a continuation of application No. 12/316,542, filed on Dec. 11, 2012, now abandoned, which is a continuation-in-part of application No. 11/729,148, filed on Mar. 27, 2007, now Pat. No. 7,954,709, which is a division of application No. 10/994,768, filed on Nov. 22, 2004, now Pat. No. 7,243,842.

(60) Provisional application No. 60/591,433, filed on Jul. 27, 2004.

(56) References Cited

U.S. PATENT DOCUMENTS

| | | |
|---|---|---|
| 4,595,984 A | 6/1986 | Daniels |
| 4,725,718 A | 2/1988 | Sansone et al. |
| 4,739,486 A | 4/1988 | Soderberg et al. |
| 4,831,555 A | 5/1989 | Sansone et al. |
| 4,839,813 A | 6/1989 | Hills et al. |
| 5,509,109 A | 4/1996 | Kim et al. |
| 5,606,507 A | 2/1997 | Kara |
| 5,629,980 A | 5/1997 | Stefik et al. |
| 5,636,292 A | 6/1997 | Rhoads |
| 5,666,284 A | 9/1997 | Kara |
| 5,682,318 A | 10/1997 | Kara |
| 5,717,597 A | 2/1998 | Kara |
| 5,737,426 A | 4/1998 | Brookner et al. |
| 5,774,886 A | 6/1998 | Kara |
| 5,778,076 A | 7/1998 | Kara et al. |
| 5,787,406 A | 7/1998 | Arsenault et al. |
| 5,796,834 A | 8/1998 | Whitney et al. |
| 5,801,364 A | 9/1998 | Kara et al. |
| 5,801,944 A | 9/1998 | Kara |
| 5,812,991 A | 9/1998 | Kara |
| 5,819,240 A | 10/1998 | Kara |
| 5,822,739 A | 10/1998 | Kara |
| 5,982,506 A | 11/1999 | Kara |
| 5,983,209 A | 11/1999 | Kara |
| 5,988,897 A | 11/1999 | Pierce et al. |
| 5,999,967 A | 12/1999 | Sundsted |
| 6,157,919 A | 12/2000 | Cordery et al. |
| 6,158,003 A | 12/2000 | Kara |
| 6,199,055 B1 | 3/2001 | Kara et al. |
| 6,208,980 B1 | 3/2001 | Kara |
| 6,233,565 B1 | 5/2001 | Lewis et al. |
| 6,233,568 B1 | 5/2001 | Kara |
| 6,244,763 B1 | 6/2001 | Miller |
| 6,249,777 B1 | 6/2001 | Kara et al. |
| 6,428,219 B1 | 8/2002 | Stier et al. |
| 6,470,327 B1 | 10/2002 | Carroll et al. |
| 6,585,778 B1 | 7/2003 | Hind et al. |
| 6,619,544 B2 | 9/2003 | Bator et al. |
| 6,671,813 B2 | 12/2003 | Ananda |
| 6,680,783 B1 | 1/2004 | Pierce et al. |
| 7,149,726 B1 | 12/2006 | Lingle et al. |
| 7,180,616 B2 | 2/2007 | Miyoshi et al. |
| 7,190,467 B2 | 3/2007 | Simpson et al. |
| 7,200,858 B1 | 4/2007 | Benjamin et al. |
| 7,216,110 B1 | 5/2007 | Ogg et al. |
| 7,236,956 B1 | 6/2007 | Ogg et al. |
| 7,243,842 B1 | 7/2007 | Leon et al. |
| 7,251,632 B1 | 7/2007 | Ogg et al. |
| 7,290,705 B1 | 11/2007 | Shin |
| 7,315,845 B2 | 1/2008 | Elliott |
| 7,353,213 B2 | 4/2008 | Ryan, Jr. et al. |
| 7,383,194 B2 | 6/2008 | Heiden et al. |
| 7,433,849 B2 | 10/2008 | Cordery et al. |
| 7,474,762 B2 | 1/2009 | Dimeski |
| 7,475,041 B2 | 1/2009 | Pintsov et al. |
| 7,490,065 B1 | 2/2009 | Ogg et al. |
| 7,711,650 B1 | 5/2010 | Kara |
| 7,784,090 B2 | 8/2010 | Lord et al. |
| 7,873,572 B2 | 1/2011 | Reardon |
| 7,933,845 B1 | 4/2011 | Leon et al. |
| 8,359,332 B1 | 1/2013 | Diamond et al. |
| 8,446,621 B2 | 5/2013 | Nuggehalli et al. |
| 8,775,331 B1 | 7/2014 | Tsuie et al. |
| 8,965,809 B1 | 2/2015 | Begen |
| 2001/0000359 A1 | 4/2001 | Schreiber et al. |
| 2001/0034716 A1* | 10/2001 | Goodwin ............ G07B 17/0008 705/60 |
| 2001/0039625 A1 | 11/2001 | Ananda |
| 2001/0044783 A1 | 11/2001 | Weisberg et al. |
| 2001/0049703 A1 | 12/2001 | Miyoshi et al. |
| 2002/0026487 A1 | 2/2002 | Ogilvie et al. |
| 2002/0029202 A1 | 3/2002 | Lopez |
| 2002/0036658 A1 | 3/2002 | Carolan et al. |
| 2002/0046182 A1 | 4/2002 | Bator et al. |
| 2002/0069260 A1 | 6/2002 | Tagg |
| 2002/0069365 A1 | 6/2002 | Howard et al. |
| 2002/0114013 A1* | 8/2002 | Hyakutake ............... H04N 1/32 382/100 |
| 2002/0116508 A1 | 8/2002 | Khan et al. |
| 2002/0178354 A1 | 11/2002 | Ogg et al. |
| 2003/0014368 A1* | 1/2003 | Leurig ................... G07F 17/42 705/64 |
| 2003/0028801 A1 | 2/2003 | Liberman et al. |
| 2003/0037008 A1 | 2/2003 | Raju et al. |
| 2003/0038965 A1 | 2/2003 | Simpson et al. |
| 2003/0078893 A1 | 4/2003 | Shah et al. |
| 2003/0088518 A1* | 5/2003 | Kirk ......................... G07F 7/025 705/62 |
| 2003/0101148 A1 | 5/2003 | Montgomery et al. |
| 2003/0167179 A1 | 9/2003 | Briley |
| 2003/0179253 A1 | 9/2003 | Manduley |
| 2003/0208406 A1 | 11/2003 | Okamoto et al. |
| 2003/0220887 A1 | 11/2003 | Stickler et al. |
| 2003/0233462 A1 | 12/2003 | Chien |
| 2004/0015404 A1 | 1/2004 | McCarthy |
| 2004/0073666 A1 | 4/2004 | Foster et al. |
| 2004/0128257 A1 | 7/2004 | Okamoto et al. |
| 2004/0128516 A1 | 7/2004 | Okamoto et al. |
| 2004/0211828 A1 | 10/2004 | Wilkie |
| 2004/0230825 A1 | 11/2004 | Shepherd et al. |
| 2004/0243523 A1 | 12/2004 | Herbert |
| 2005/0065892 A1 | 3/2005 | Ryan et al. |
| 2005/0065897 A1 | 3/2005 | Ryan et al. |
| 2005/0138469 A1 | 6/2005 | Ryan et al. |
| 2005/0192910 A1 | 9/2005 | Auberger et al. |
| 2005/0228760 A1 | 10/2005 | Monsen et al. |
| 2005/0235351 A1 | 10/2005 | Seltzer et al. |
| 2006/0072174 A1 | 4/2006 | Koike et al. |
| 2006/0098650 A1 | 5/2006 | Beninato et al. |
| 2006/0101121 A1 | 5/2006 | Senechalle |
| 2006/0259964 A1 | 11/2006 | Maldonado et al. |
| 2006/0290976 A1 | 12/2006 | Ko et al. |
| 2007/0022059 A1 | 1/2007 | Heiden |
| 2007/0073628 A1 | 3/2007 | Pauly et al. |
| 2007/0124260 A1 | 5/2007 | Meyer et al. |
| 2007/0174213 A1 | 7/2007 | Whitehouse et al. |
| 2007/0177920 A1 | 8/2007 | Katano et al. |
| 2007/0282753 A1 | 12/2007 | Schwartz et al. |
| 2008/0071691 A1 | 3/2008 | Meyer et al. |
| 2008/0092239 A1 | 4/2008 | Sitrick et al. |
| 2008/0209533 A1 | 8/2008 | Abrams et al. |
| 2008/0294726 A1 | 11/2008 | Sidman |
| 2009/0125387 A1 | 5/2009 | Mak et al. |
| 2009/0141895 A1 | 6/2009 | Anderson et al. |
| 2009/0245521 A1 | 10/2009 | Vembu et al. |
| 2009/0327409 A1 | 12/2009 | Mayer et al. |
| 2010/0046029 A1 | 2/2010 | Suzuki et al. |
| 2012/0054822 A1 | 3/2012 | Dvorak et al. |
| 2013/0125248 A1 | 5/2013 | Whitten et al. |

OTHER PUBLICATIONS

English translation of EP1916628 to Mayer Oct. 2006.

Merriam-Webster, "postal", 2014.

Merriam-Webster, "postage" 2014.

Merriam-Webster, "indicia", 2014.

(56) References Cited

OTHER PUBLICATIONS

USPS, "Information-Based Indicia Program (IBIP), Performance Criteria for Information-Based Indicia and Security Architecture for Open IBI Postage Evidencing Systems (PCIBI-O)", 2000.
<http://www.deutschepost.de/dpag?tab=1&skin=hi&check=yes&lang=de_EN&xm1File=link>1017124_1009569; "Stampit—The license for postage printing," and "Stampit Web," pp. 2, printed May 21, 2009.
<http://www.adobe.com/enterprise/pdfs/ger_deutschePost.pdf>; "Deutsche Post uses Adobe solutions and the Web to enable reliable printing of pre-paid stamps for parcel delivery," pp. 2, Sep. 2005.
Wikipedia, "Franking", 2014.

\* cited by examiner

| Indicia Content Description |
|---|

Indicia Content

IBI Version      06062S
MATS Model ID    N/A
PSD              IBM 4758 Host

| Field Order in Indicia | Field Length Bytes | Fixed Value | Format | Description | |
|---|---|---|---|---|---|
| 1 | 1 | 06 | Binary | Indicia Version | 441 |
| 2 | 2 |  | Binary | Software ID | 442 |
| 3 | 3 |  | Binary | Postage Value | 443 |
| 4 | 2 | 06 | Text | IBI Vendor | 444 |
| 5 | 2 | 2S | Binary | Model ID | 445 |
| 6 | 8 |  | Binary | Indicia ID Number | 446 |
| 7 | 2 |  | Binary | Encoder values | 447 |

Total Bytes≈20

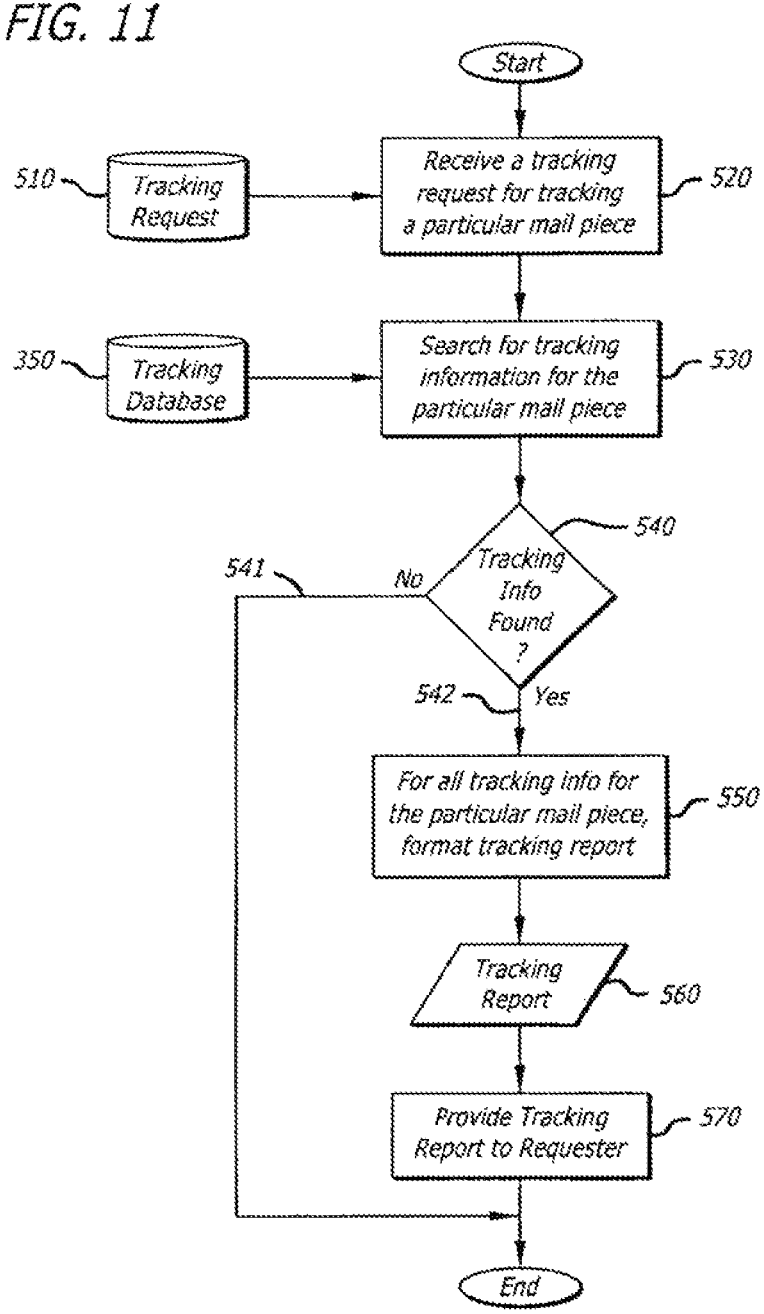

FIG. 12

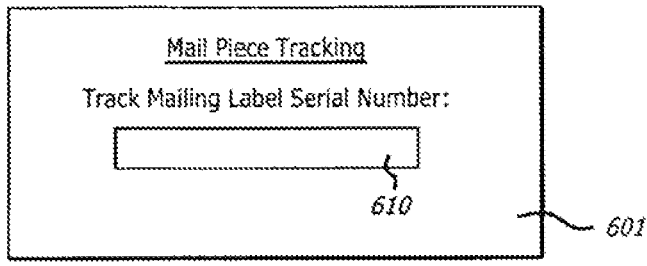

FIG. 13

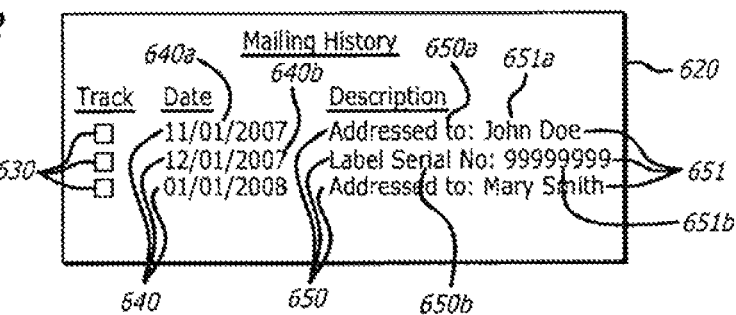

FIG. 14

| Field Order in Indicia | IBI DD Field Reference Number | Field Length | Indicia Offset | Data Elements | | Fixed Value |
|---|---|---|---|---|---|---|
| 1 | 11 | 1 | 0 | Indicia Version Number | 1401 | 49 |
| 2 | 1 | 1 | 1 | Algorithm ID | 1402 | 1 |
| 3 | 3 | 4 | 2 | Certificate Serial Number | 1403 | |
| 4 | 10 | 2 | 6 | IBI Vendor ID | 1404 | 06 |
| 5 | 16 | 2 | 8 | PSD Model Number | 1405 | 2S |
| 6 | 17 | 4 | 10 | PSD Serial Number | 1406 | |
| 7 | 2 | 5 | 14 | Ascending Register | 1407 | |
| 8 | 15 | 3 | 19 | Postage Value | 1408 | |
| 9 | 5 | 4 | 22 | Date of Creation | 1409 | |
| 10 | 14 | 4 | 26 | Originating Zip Code | 1410 | |
| 11 | 18 | 2 | 30 | Software ID2 | 1411 | |
| 12 | 27 | 7 | 32 | LabelSheetID | 1412 | |
| 13 | 28 | 2 | 39 | LabelID | 1413 | |
| 14 | 7 | 4 | 41 | Descending Register | 1414 | |
| 15 | 12 | 4 | 45 | Mail category | 1415 | |
| 16 | 9 | 40 | 49 | Digital Signature | 1416 | |
| Total Bytes | | 89 | | | | |

FIG. 15

| Field Order in Indicia | IBI DD Field Reference Number | Field Length | Indicia Offset | Data Elements | | Decimal Fixed Value |
|---|---|---|---|---|---|---|
| 1 | 11 | 1 | 0 | Indicia Version Number | 441 | 255 |
| 2 | 30 | 4 | 1 | Piece Counter | 1501 | |
| 3 | 35 | 1 | 5 | IBI Vendor/Model | 1502 | 97 |
| 4 | 36 | 3 | 6 | PSD Serial Number3 | 1503 | |
| 5 | 15 | 3 | 9 | Postage Value | 443 | |
| 6 | 37 | 2 | 12 | Intelligent Mail Service | 1504 | |
| 7 | 22 | 5 | 14 | Reserved5 | 1505 | |
| 8 | 39 | 1 | 19 | Reserved1 | 1506 | |
| Total Bytes | | 20 | | | | |

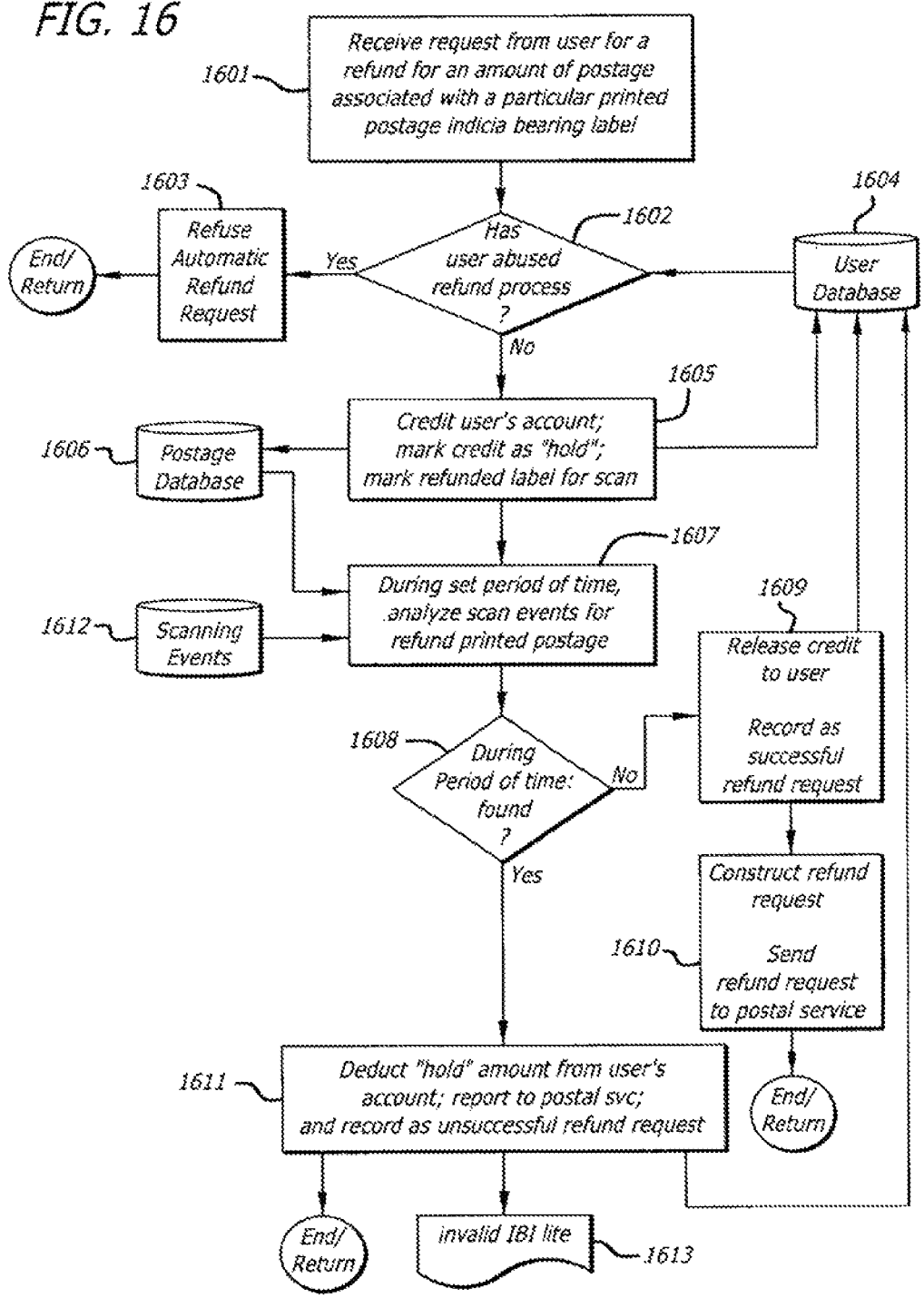

SYSTEMS AND METHODS FOR PROTECTING CONTENT WHEN USING A GENERAL PURPOSE USER INTERFACE APPLICATION

CROSS-REFERENCE TO RELATED APPLICATIONS

The present application is a continuation in part of, and claims benefit of priority to the earliest priority date for, U.S. patent application Ser. No. 16/422,912, titled "SYSTEMS AND METHODS FOR PROTECTING CONTENT WHEN USING A GENERAL PURPOSE USER INTERFACE APPLICATION," filed May 24, 2019, which is a continuation of U.S. patent application Ser. No. 15/630,849, now U.S. Pat. No. 10,339,280, titled "SYSTEMS AND METHODS FOR PROTECTING CONTENT WHEN USING A GENERAL PURPOSE USER INTERFACE APPLICATION," filed Jun. 22, 2017, which is a continuation of U.S. patent application Ser. No. 12/103,465, now U.S. Pat. No. 9,728,107, titled "SYSTEMS AND METHODS FOR PROTECTING CONTENT WHEN USING A GENERAL PURPOSE USER INTERFACE APPLICATION," filed Apr. 15, 2008, and is a continuation in part of, and claims benefit of priority to the earliest priority date for, U.S. patent application Ser. No. 15/651,893, titled "MAIL PIECE PROCESSING," filed Jul. 17, 2017, which is a continuation of U.S. patent Ser. No. 12/316,542, titled "MAIL PIECE PROCESSING," filed Dec. 11, 2012, which is a continuation in part of U.S. patent Ser. No. 11/729,148, now U.S. Pat. No. 7,954,709, titled "COMPUTER-BASED VALUE-BEARING ITEM CUSTOMIZATION SECURITY," filed Mar. 27, 2007, which is a divisional of U.S. patent application Ser. No. 10/994,768, now U.S. Pat. No. 7,243,842, titled "COMPUTER-BASED VALUE-BEARING ITEM CUSTOMIZATION SECURITY," filed Nov. 22, 2004, which claimed benefit of provisional U.S. Patent Application No. 60/591,433, titled "COMPUTER-BASED VALUE-BEARING ITEM CUSTOMIZATION SECURITY," filed Jul. 27, 2004, the disclosures of each of which are hereby incorporated herein by reference in their entirety.

The present application is related to U.S. patent application Ser. No. 10/747,936, titled "OUTBOUND MAIL PIECE TRACKING," filed on Dec. 29, 2003, the disclosure of which is hereby incorporated herein by reference in their entirety.

The present application is also related to U.S. patent application Ser. No. 10/731,992, titled "COMPUTER POSTAGE AND MAILING TRACKING LABELS," filed on Dec. 8, 2003; U.S. patent application Ser. No. 09/975,532, titled "SYSTEM AND METHOD FOR PROVIDING COMPUTER-BASED POSTAGE STAMPS," filed Oct. 10, 2001, which claims the benefit of U.S. Provisional Application No. 60/239,424, titled "A SYSTEM AND METHOD FOR PROVIDING COMPUTER BASED POSTAGE STAMPS," filed Oct. 10, 2000; U.S. patent application Ser. No. 09/905,329, titled "WEB-ENABLED VALUE BEARING ITEM PRINTING," filed Jul. 13, 2001; U.S. patent application Ser. No. 09/585,025, titled "ON-LINE VALUE BEARING ITEM PRINTING," filed Jun. 1, 2000; and U.S. patent application Ser. No. 10/197,044, titled "GENERIC VALUE BEARING ITEM LABELS", filed Jul. 16, 2002, the disclosures of each of which are hereby incorporated herein by reference in their entirety.

TECHNICAL FIELD

The invention relates generally to protecting value bearing indicia and, more particularly, to providing protection of value bearing indicia when using a general purpose user interface application.

BACKGROUND OF THE INVENTION

The ability to meter value bearing indicia (VBI) for printing in the form of postage indicia has been available for an appreciable amount of time. For example, postage meters using mechanical postage value "vaults" have been widely used in businesses throughout the world for printing postage indicia, commonly referred to as meter stamps, on an as-needed basis. In more recent years, electronic systems were developed using electronic postage value vaults to provide improved security. The evolution of such electronic systems has ultimately led to the development of postage metering systems which allow remote metering operations using communications via the public switched telephone network (PSTN), local area networks (LANs), wide area networks (WANs), and the Internet. For example, U.S. Pat. No. 6,249,777 entitled "System and Method for Remote Postage Metering," U.S. Pat. No. 6,671,813 entitled "Secure On-Line PC Postage Metering System," and U.S. Pat. No. 7,149,726 entitled "Online Value Bearing Item Printing," the disclosures of which are incorporated herein by reference, show various electronic VBI metering systems facilitating remote metering operations.

In providing remote metering operations, the electronic metering systems have typically implemented specialized metering technology both at a user's site and the site remote thereto (e.g., a centralized metering site). Even where otherwise open systems are utilized, such as personal computer (PC) platforms or other general-purpose processor based systems, specialized metering technology in the form of a postage metering application or client has generally been required. Although providing vast improvements in availability to users and intuitive, robust user interfaces, the use of such specialized metering technology tends to limit the use of such metering systems. For example, in order for a PC user to interact with a remote postage server in order to obtain and print a VBI, such as in the form of a postage indicia, the user must generally download, or otherwise install, one or more specialized software applications which are adapted for interacting with the remote postage server. Such specialized software applications have often been required in order to enforce security paradigms with respect to the obtaining and printing of value, such as in the form of the VBI.

Although the current state of technology would not prevent an embodiment wherein a general purpose user interface application, such as a web browser application (e.g., INTERNET EXPLORER available from Microsoft Corporation, NETSCAPE available from Netscape Communications, Safari available from Apple Inc., and Firefox available from Mozilla Corporation), was used with respect to remote metering operations, the general belief is that the open nature of such general purpose user interface applications is not compatible with the desired level of security. For example, general purpose user interface applications generally facilitate user freedom with respect to printing, accessing content for copying into an electronic clipboard, etc.

Such freedom with respect to general purpose user interface applications can lead to even the casual user performing unpermitted or otherwise undesired activities. For example, a user might simply select a print menu (e.g., FILE PRINT) in order to print multiple copies of a VBI. Similarly, a user might manipulate a pointing device (e.g., mouse) in order to select and copy a VBI for pasting into another software application, such as for duplicating, modification, storing, etc.

CONFIRM® service is a product offered by the United States Postal Service. U.S. Postal Service *Publication* 197 ("*Publication* 197") describes in detail various aspects of the CONFIRM® service and CONFIRM® service interfaces; Publication 197 is incorporated by reference in full herein for all purposes as if fully stated herein.

CONFIRM® is a mail tracking service of PLANET™ Codes that provides electronic tracking information to USPS customers about their First-Class, Standard letter-size, flat mail and periodicals. CONFIRM® provides advance delivery information about incoming hard-copy reply mail ("Origin CONFIRM®") and outbound mail ("Destination CONFIRM®").

In order to track mail, CONFIRM® uses a combination of two tracking numbers: a 5- or 11-digit POSTNET (POStal Numeric Encoding Technique) Code and a 12- or 14-digit PLANET™ Code. The POSTNET and PLANET™ Codes must be encoded as a barcode and applied to the mail piece.

In order to facilitate mail handling and optical reading equipment processing of mail by the USPS and to properly interpret PC Postage, addressee information, and CONFIRM® tracking information, postage indicia and related labels need to be applied according to USPS guidelines. USPS guidelines directed to the margins, label sizes, and placement of postage indicia, and the size, placement, and other characteristics of POSTNET and PLANET™ bar codes, and any facing identification mark (FIM) on mail pieces are described in the Domestic Mail Manual (DMM) and Title 39, Code of Federal Register (CFR), Part 111, the contents of which are incorporated by reference in full herein for all purposes.

As each mail piece progresses through to its destination, the USPS may scan the CONFIRM® barcode on the mail piece as it passes through different USPS processing facilities. Electronic information for each scan is captured and is sent to a centralized network service, which collects the scan data and packages it for use by USPS customers. The electronic scan information is then electronically transferred from the centralized network and is made available in two ways: through accessing a PLANET™ Codes website or via transmission of electronic files sent to subscribing USPS customers.

Notably, though, the USPS may sometimes miss scanning the CONFIRM® barcode on a mail piece. For example, a CONFIRM® barcoded mail piece may fail to be scanned due to equipment problems.

CONFIRM®-barcoded mail pieces may be scanned during the passage of the mail piece through various USPS processing facilities, but are not scanned (unless accompanied by Delivery Confirmation, Signature Confirmation, or similar final mail piece disposition service) upon actual delivery.

A POSTNET Code identifies a particular delivery address. A PLANET™ Code identifies a particular CONFIRM® Subscriber's mailing. If more than one mail piece in a single mailing is addressed to the same delivery address, then the CONFIRM® Service does not provide individual mail piece tracking.

The CONFIRM® service was designed to serve the high-volume mailer such as telemarketers and other businesses. High-volume mailers can benefit from tracking outbound mailings. For example, information about customer receipt of certain mailings would allow mailers to plan subsequent business activities, such as synchronizing telemarketing efforts with delivery of solicitations, or augmenting direct mail pieces with other advertising media.

The high-volume mailer basis for the CONFIRM® service is evident from the subscription fee structure charged by the U.S. Postal Service. The subscription fees, ranging from $2,000 for a three-month period, to an annual $10,000 fee, are based on the number of scans, measured in the millions.

Although large mailings are not normally the concern of individuals, individuals with low volume mailings could benefit from the ability to track processing and delivery of individual mail pieces. Low volume mailers will not be motivated to pay the high subscription fees for the U.S. Postal CONFIRM® Service. Even if they paid such fees, the CONFIRM® Service does not guarantee tracking of individual mail pieces.

Various private carriers provide individual parcel tracking, for a piece-based premium. And yet, no mail piece tracking is available for letters mailed using first class U.S. postage.

DELIVERY CONFIRMATION is another service provided by the U.S. Postal Service. DELIVERY CONFIRMATION provides the date, time and ZIP Code of delivery or attempted delivery. DELIVERY CONFIRMATION can be purchased for PRIORITY MAIL® items, Package Services parcels, STANDARD MAIL® parcels, and FIRST-CLASS MAIL® parcels, but is not available for use with FIRST-CLASS MAIL® letters.

A way for low-volume mailers to track individual outbound mail pieces is needed. Further, a way is needed to include USPS scan events for computer-based postage indicia as part of the data available for mail piece tracking.

BRIEF SUMMARY OF THE INVENTION

Embodiments of the present invention are directed to systems and methods which prevent or limit access to protected content (e.g., value bearing indicia (VBI)) by a general purpose user interface application to thereby provide protection with respect to this content. Embodiments of the invention implement techniques to avoid displaying protected content by a general purpose user interface application, or displaying protected content during a time in which a user does not have access to particular functions of the general purpose user interface application, (collectively referred to herein as preventing accessible display of protected content) to protect the content from various operations, such as repeated printing, electronic copying, etc. General purpose user interface applications as may be the subject of content protection provided according to embodiments of the invention may comprise web browsers, network browsers, and the like. Protected content as may be provided protection according to embodiments of the present invention may comprise postage indicia, indicia used in electronic commerce, information content (e.g., online reference material), and the like.

According to embodiments of the invention, data presentation formatting control in the form of style sheets is utilized with respect to content provided to a general purpose user interface application to control access to content. Using style sheet based formatting control, such as is available using cascading style sheet (CSS) formatting available with respect to many commercially available browser applications, content can be marked to apply to various input/output (I/O) devices. For example, using CSS formatting particular content may be marked to apply only to the display, only to the printer, or to both the display and the printer. According to embodiments, two style sheets may be utilized to provide the foregoing protection to content. A first such style sheet may be applicable with respect to the display of a sample image (e.g., sample VBI) and thus is used when displaying a page to the user, wherein the protected content (e.g., actual VBI) is marked as hidden in this style sheet. A second such style sheet may be applicable with respect to the printing of protected content and thus is used when printing a page containing protected content, wherein the sample image is marked as hidden in this style sheet. Accordingly, when a page is printed, the second style sheet causes the sample image to be hidden from the printer and the protected content to be provided to the printer and thus the printed output shows the protected content.

In the foregoing embodiment, although the protected content may be present in the content provided to the general purpose user interface application, the protected content is hidden from the user, or otherwise avoiding viewable or actionable interaction by a user, thus preventing the user from accessing the protected content, such as through copying into an electronic clipboard. Moreover, because style sheet based formatting control is implemented in protecting the content, enhanced features such as scripting language control need not be activated with respect to the general purpose user interface application, thus potentially making operation of this embodiment compatible with a large number of user systems. Likewise, because the protected content is protected from user interaction, such as by being hidden from the user, and no client/server interaction need be invoked for printing, embodiments may be utilized to provide a satisfactory user experience without the risk of confusion associated with content appearing to change during printing, impeded operation at the time of printing due to firewall issues, operation of a popup blocker, etc.

Embodiments of the invention implement executable code or an executable object within a page or other content provided to a general purpose user interface application to control access to content. According to embodiments, a client-side scripting language, such as JAVASCRIPT, VB SCRIPT, J SCRIPT, or ECMA SCRIPT, is used with respect to web page content in order to replace particular content (e.g., an image source) upon printing. For example, a web page may be built to contain a sample image (e.g., sample VBI) without protected content (e.g., an actual VBI). If the user utilizes a print control native to the general purpose user interface application (e.g., the FILE PRINT command in a web browser), the sample image will be printed. However, according to a preferred embodiment, a link or button is included within the page itself in order to facilitate printing, or other desired activity, with respect to the protected content. For example, when such a button or link is clicked, scripting language code may replace the source (e.g., uniform resource locator (URL)) of the sample image with a source (e.g., another URL) of the protected content and invoke printing functionality (e.g., invoke a browser's native print functionality), thereby causing the protected content to be printed. After the print operation, or other desired activity, the scripting language code will preferably restore the original source back to the source of the sample image.

In the foregoing embodiment, although providing display of a sample image, such as for use in previewing a printable product, the protected content appears only briefly when printing, or performing other selected activity, thus preventing the user from accessing the protected content, such as through copying into an electronic clipboard. That is, because other functions of a general purpose user interface application are typically not available during a print operation, the user is prevented from interacting in any way with the protected content during the brief period in which it is displayed. Moreover, the protected content is only provided to the general purpose user interface application during the printing operation, thereby further providing protection with respect to this content.

According to embodiments of the invention, separate windows or pages are utilized to control access to content. According to an embodiment, a web page is built to contain a sample image (e.g., sample VBI) without protected content (e.g., an actual VBI). If the user utilizes a print control native to the general purpose user interface application (e.g., the FILE PRINT command in a web browser), the sample image will be printed. A link or button is, however, preferably included in the page itself in order to facilitate printing, or other desired activity, with respect to the protected content. For example, when such a button or link is clicked, a new window or page (collectively referred to herein as a new area) is preferably opened. This new area will, according to embodiments, include the protected content. According to a preferred embodiment, the new area will immediately invoke printing functionality (e.g., invoke a browser's native print functionality), thereby causing the protected content to be printed, and then the new area will close.

In the foregoing embodiment, although providing display of a sample image, such as for use in previewing a printable product, the protected content appears only briefly when printing, or performing other selected activity, thus preventing the user from accessing the protected content, such as through copying into an electronic clipboard. In addition to the protected content only being provided to the general purpose user interface application during the printing operation, client/server interaction for serving up the new area is preferably invoked, thereby facilitating a higher level of monitoring and/or control with respect to the protected content.

It should be appreciated that various techniques may be used in combination according to embodiments of the invention in order to provide desired protection with respect to content. For example, style sheet based formatting control may be used in combination with executable code and/or the use of separate areas (e.g., windows or pages) in order to avoid displaying protected content as well as avoid providing such content to a general purpose user interface application only when particular functions are being performed.

Control techniques in addition to those associated with the client-side may be implemented in providing protection of content according to embodiments of the invention. For example, a combination of client-side techniques and server-side techniques may be utilized in restricting activity with respect to protected content, such as to limit printing of the protected content to one-time only. According to an embodiment, a combination of client-side scripting and server-side code is used, such that client-side scripting causes a sample image to be printed instead of protected content once the protected content has been printed once and server-side code ensures that the page with the ability to print protected content is only sent to a client general purpose user interface application once (e.g., subsequent re-loads only provide the sample image).

An exemplary embodiment of the present invention provides a way for low-volume mailers to track individual outbound mail pieces, including tracking of individual U.S. Postal Service FIRST-CLASS MAIL® letters. An exemplary embodiment of the present invention supports tracking of multiple mail pieces mailed by multiple mailers using a single computer-based postage system.

An exemplary embodiment of the present invention encodes a unique (or substantially unique, or relatively unique, such as during a particular period of time) mail piece tracking identifier as a CONFIRM® service identifier in a graphic symbology. The unique (or substantially unique, or relatively unique, such as during a particular period of time) mail piece tracking identifier of an exemplary embodiment of the present invention conforms with requirements of a CONFIRM® service identifier, while at the same time, provides, for a defined period of time, relative mail-piece-level uniqueness for first class and other mail class mail piece tracking.

Although certain exemplary embodiments of the present invention are described hereinbelow with reference to CONFIRM® identifiers (regarding POSTNET and PLANET™ codes), it will be understood by someone with ordinary skill in the art, as will be briefly described further below, that other exemplary embodiments of the present invention could be implemented using other types of barcodes or other types of symbologies and/or sensing technologies.

For example, in the present USPS implementation of the CONFIRM® service, and in an exemplary embodiment of the present invention described hereinbelow, PLANET™ Codes are represented by a 2-state barcode. The present invention is not limited to representation of PLANET™ Codes by a 2-state barcode or to use of the CONFIRM® service. Rather, embodiments of the present invention would apply to other types of barcodes, such as matrix, 3-state, 4-state barcodes, and various other types of barcodes and machine-readable technologies.

As will be understood by someone with ordinary skill in the art, a 2-state barcode encodes characters in a pattern of, e.g., four bars or five bars, per character; each 2-state barcode bar is either a tall bar or a short bar (i.e. two possible "states" for each bar). As will be understood by someone with ordinary skill in the art; bars of both lengths emanate in the same direction, e.g., upward, from a common horizontal line.

As will be understood by someone with ordinary skill in the art, a 3-state barcode uses a long bar and two types of short bars—one 3-state short bar emanates from the top down, and the other 3-state short bar emanates from the bottom up.

As will be understood by someone with ordinary skill in the art, a 4-state barcode uses four bar states. The four states are: tall bars, short bars, medium height bars that extend upward (ascender) from a middle track of the barcode symbol, and medium height bars that extend downward (descender) from the middle track of the barcode symbol. One 4-state barcode, called the Royal Mail 4-state Customer Code (RM4SCC), uses a combination of four bars, two ascenders and two descenders, to represent each character. It will be understood by someone with ordinary skill in the art that a 4-state barcode can be used to represent more information in the same amount of space occupied by a 2-state barcode.

It will be further understood by someone with ordinary skill in the art that the description of barcodes in an exemplary embodiment is illustrative of machine readable codes and symbologies and similar sensing technologies, including barcodes, matrix codes, digital watermarks, conventional metered payment indicia from meters, magnetic strips, magnetic chips, and the like. The description of barcodes in an exemplary embodiment is not a limitation of the invention. As will be understood by someone with ordinary skill in the art, the present invention is not limited to machine-readable or machine-sensable technologies described herein or now known, but would be equally applicable to machine readable technologies not now known or not described herein provided that the machine readable and/or machine-sensing indicia provided by such technologies can be printed on, affixed to, deposited on, or otherwise displayed on or associated with a particular mailpiece.

Although exemplary embodiments of the present invention are sometimes described herein with specific reference to tracking outbound first class mail pieces, it will be understood by someone with ordinary skill in the art that embodiments of the present invention would apply equally to other classes of mail as long as the USPS, or other postal service, provides the CONFIRM® service, or a service such as, or similar to, CONFIRM® for that class of mail. It will be understood by someone with ordinary skill in the art that Express Mail, and mail pieces for which Delivery Confirmation or Signature Confirmation has been purchased, are assigned a unique (or substantially unique, or relatively unique, such as during a particular period of time) tracking identifier with which a postal customer can track the delivery of the particular mail piece. However, in the case of Delivery Confirmation or Signature Confirmation pieces, only actual delivery, not progress through the postal system, can be tracked by virtue of the Delivery Confirmation or Signature Confirmation identifier. Further, in the case of PC Postage, Express Mail PC Postage is not specifically related in a computer system to a particular Express Mail Serial Number, but rather, is related to a date and delivery address. Further, in the case of PC Postage for Express Mail, Delivery Confirmation and Signature Confirmation pieces, although the PC Postage label itself is related to a particular mailer, the Express Mail, Delivery Confirmation or Signature Confirmation tracking number for the particular piece of mail is not related in a computer system to a particular mailer.

Exemplary embodiments of the present invention provide a method for tracking individual outbound mail pieces, said method comprising: assigning an identifier to a particular mail piece wherein said identifier uniquely (or substantially unique, or relatively unique) identifies the particular mail piece during a particular period of time; and relating the unique (or substantially unique, or relatively unique) mail piece identifier to a particular mailer.

Exemplary embodiments of the present invention provide a unique (or substantially unique, or relatively unique) mail piece identifier graphic symbology, said unique (or substantially unique, or relatively unique) mail piece identifier graphic symbology comprising: an encoded subscriber identifier; an encoded mailing identifier; and an encoded delivery address identifier, wherein the encoded delivery address identifier is unique (or substantially unique, or relatively unique) within a combination of the encoded subscriber identifier and the encoded mailing identifier.

Exemplary embodiments of the present invention provide a method of encoding a unique (or substantially unique, or relatively unique) mail piece identifier as a graphic symbology, said method comprising: assigning an identifier to a particular mail piece wherein said identifier uniquely (or substantially uniquely, or relatively uniquely) identifies the particular mail piece during a particular period of time and wherein said identifier comprises a subscriber identifier, a mailing identifier, and a delivery address identifier, wherein the delivery address identifier is unique (or substantially unique, or relatively unique) within a combination of the subscriber identifier and the mailing identifier.

Notably, though, the USPS may sometimes miss scanning the CONFIRM® barcode on a mail piece. For example, a CONFIRM® barcoded mail piece may fail to be scanned due to equipment problems.

In view of the failure by the USPS to sometimes scan a CONFIRM® barcoded mail pieces, an alternative exemplary embodiment of the present invention would combine tracking based on CONFIRM® CCID barcoded mail piece scans, with tracking of scanned computer-based postage indicia, such as tracking of scanned computer-based IBI Lite postage indicia.

One alternative exemplary embodiment of the present invention would provide a method for processing individual mail pieces using a computer-based postage system, said method comprising: deriving a set of derived, value-bearing item indicia information from a corresponding set of full, digitally-signed, computer-based, value-bearing item indicia information; and generating a value-bearing item comprising a set of value-bearing item indicia, wherein said set of value-bearing item indicia corresponds to the set of derived, value-bearing item indicia information.

The method of such an alternative exemplary embodiment of the present invention would further comprise: creating a reference on a computer-accessible memory between a subset of the set of derived, value-bearing item indicia information and the corresponding set of full, digitally-signed, computer-based, value-bearing item indicia information.

The method of such an alternative exemplary embodiment of the present invention would further comprise: receiving an electronic record comprising an indication of value-bearing item indicia information.

The method of such an alternative exemplary embodiment of the present invention would further comprise: using a subset of the indication of value-bearing item indicia information to search the computer-accessible memory for a matching reference on the computer-accessible memory.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 1B is a graphic representation depicting an exemplary graphical user interface for obtaining a customer's request to track a particular mail piece in an exemplary embodiment of the present invention;

FIG. 7 is a chart depicting exemplary content format for exemplary derivative, sometimes referred to herein as "IBI Lite," machine-readable postage indicia data in the alternative exemplary embodiment of the present invention;

FIG. 11 is a high level flow diagram depicting exemplary high level logic functions for exemplary mail piece tracking in the alternative exemplary embodiment of the present invention;

FIG. 12 is a graphic representation depicting an exemplary graphical user interface for providing an exemplary Mail Piece Tracking input screen in the alternative exemplary embodiment of the present invention;

FIG. 13 is a graphic representation depicting an exemplary graphical user interface for providing an exemplary Mailing History screen that would present a list of printed postage for selection by a user for tracking in the alternative exemplary embodiment of the present invention;

FIG. 14 is a chart depicting exemplary content format for exemplary full, digitally signed, generic machine-readable postage indicia data in the alternative exemplary embodiment of the present invention;

FIG. 15 is a chart depicting alternative exemplary IBI Lite content and content format for alternative exemplary machine-readable IBI Lite postage indicia data in a further alternative exemplary embodiment of the present invention; and FIG. 16 is a high level flow diagram depicting exemplary high level logic functions for exemplary computer-based postage indicia refund processing in an exemplary refund embodiment of the present invention.

DETAILED DESCRIPTION OF THE INVENTION

Exemplary Value Bearing Indicia Protection Embodiments

Figure 1A:
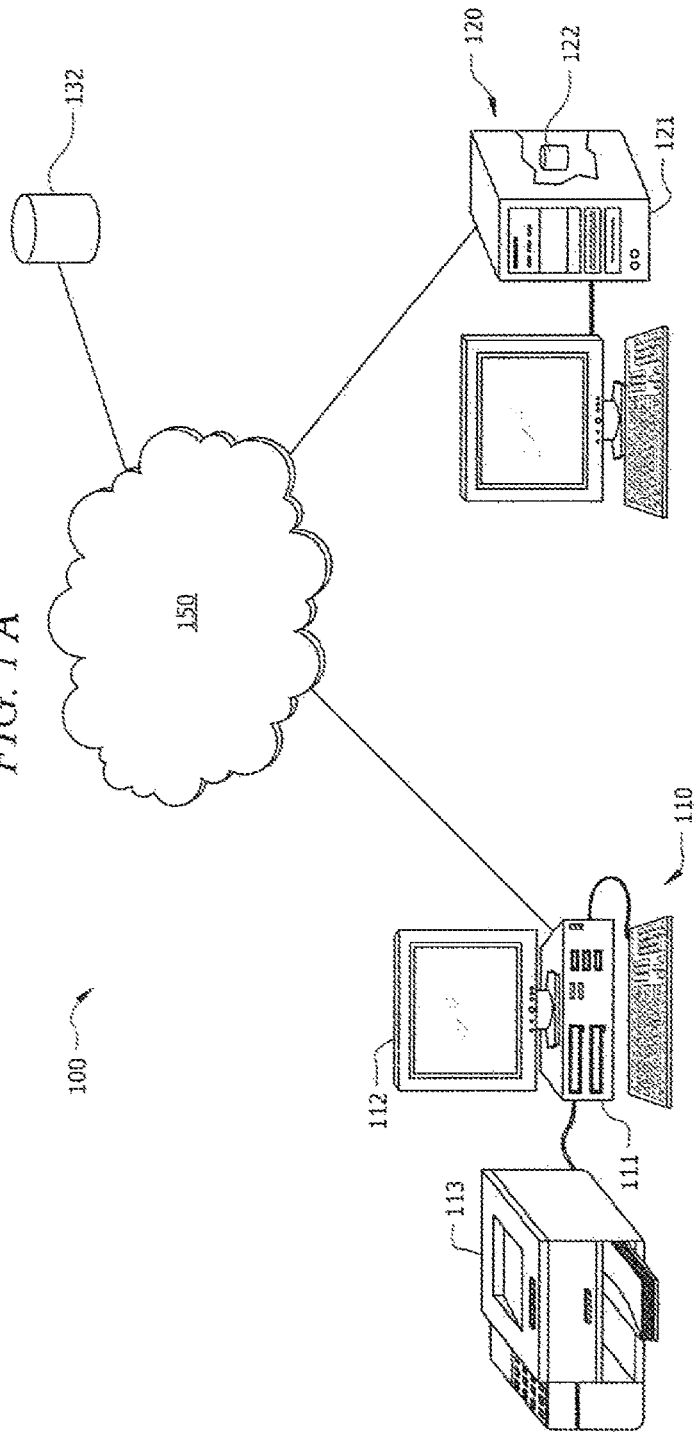
FIG. 1A shows a system adapted to provide protection of content according to an embodiment of the invention.

Directing attention to FIG. 1A, system 100 adapted to prevent or limit access to protected content (e.g., value bearing indicia (VBI)) by a general purpose user interface application to thereby provide protection with respect to this content is shown. System 100 of the illustrated embodiment includes user terminal (e.g., client-side system) 110 in communication with content server (e.g., server-side system) 120 via network 150. Various systems as may provide a platform for adaptation to prevent or limit access to protected content as described herein are shown in the above referenced patents entitled "System and Method for Remote Postage Metering," "Secure On-Line PC Postage Metering System," and "Online Value Bearing Item Printing."

Network 150 provides information communication between content server 120 and user terminal 110. Network 150 of embodiments may comprise the Internet, an intranet, an extranet, a local area network (LAN), a metropolitan area network (MAN), a wide area network (WAN), the public switched telephone network (PSTN), a wireless network, a cable transmission system, a satellite communication network, and/or the like. According to preferred embodiments multiple users operating respective user terminals may access and obtain content from content server 120.

Content server 120 preferably comprises a processor-based system, such as a computer having a central processing unit (CPU), memory, and appropriate input/output (I/O) devices and interfaces, operable under control of an instruction set defining operation as described herein. For example, content server 120 may comprise server platform 121 having a processor from the PENTIUM family of processors available from Intel Corporation, Santa Clara, California. Content server 120 provides storage and controlled access to various content. Accordingly, content server 120 of the illustrated embodiment comprises database 122, and/or is in communication with database 132, storing content therein.

User terminal 110 preferably comprises a processor-based system, such as computers having a CPU, memory, and appropriate I/O devices and interfaces, operable under control of instruction sets defining operation as described herein. For example, user terminal 110 may comprise computer platform 111 having a processor from the PENTIUM family of processors available from Intel Corporation, Santa Clara, California. User terminal 110 preferably provides output of content, protected according to embodiments of the invention, in various media under control of a general purpose user interface application (e.g., web browser, network browser, etc.). Accordingly, the illustrated embodiments of user terminal 110 includes display 112 (e.g., a cathode ray tube (CRT), liquid crystal display (LCD), plasma screen, etc.) for outputting content in a transient medium and printer 113 (e.g., an ink jet printer, a laser printer, a thermal transfer printer, a label printer, an envelope printer, etc.) for outputting content in a printed medium.

Embodiments of the present invention will be described herein with reference to protected content in the form of value bearing indicia (VBI), such as may be used with respect to postage metering applications, in order to provide examples for facilitating an understanding of the concepts of the present invention. Accordingly, content server 120 of embodiments described below may comprise a remote postage server wherein a web browser of user terminal 110 interacts with content server 120 for generating and printing postage indicia (e.g., information based indicia (IBI) utilized by the United States Postal Service (USPS)). Of course, other forms of content may be provided protection according to embodiments of the invention. For example, content provided by online reference material sites, such as SAFARI, BOOKS ONLINE, NEW YORK TIMES archives, etc., may be provided protection according to embodiments of the invention, such as to provide a print of a full chapter or article for a fee while making only excerpts available for viewing online. Likewise, different forms of general purpose user interface applications may be used according to embodiments of the present invention. Moreover, although examples are described herein with reference to protecting content for printing operations, protection of content using the concepts of the present invention may be applied to various activities and functions, such as to provide protection with respect to forwarding content from one user terminal to another user terminal.

Figure 2A:
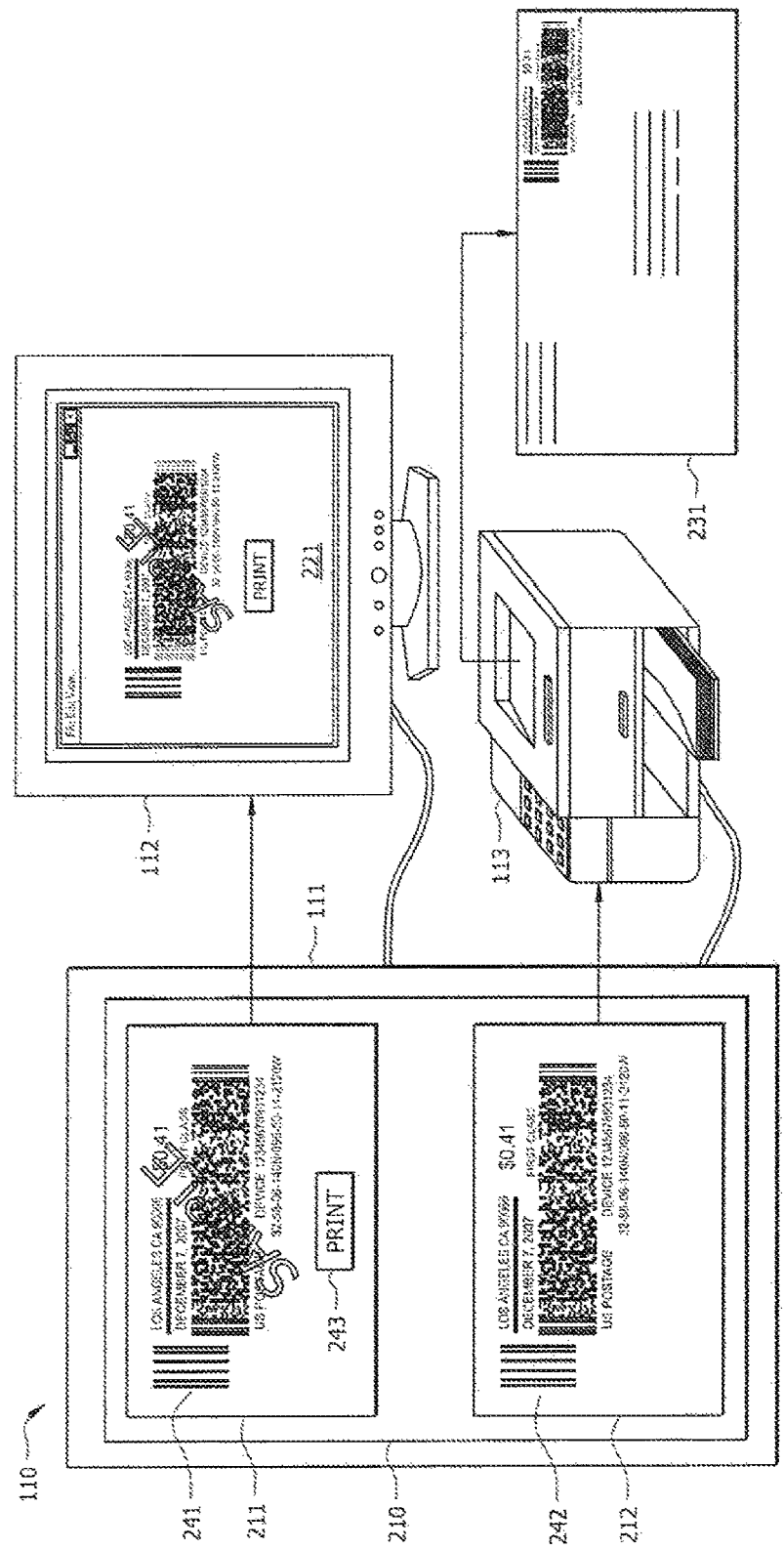
FIG. 2A shows detail with respect to unprotected and protected content according to embodiments of the invention.

According to embodiments of the invention, data presentation formatting control in the form of style sheets is utilized with respect to content provided to web browser 210 (FIG. 2A) operable upon user terminal 110 to control access to content. For example, user terminal 110 operable under control of web browser 210 may interact with content server 120 to provide and obtain various content, such as may be stored in databases 122 and 132 and/or generated by content server 120, in order to print postage meter indicia on demand. The aforementioned content may comprise various web pages served to user terminal 110 by content server 120. Through such web pages user terminal 110 may provide various content, such as address information, mail item size and/or weight, postal class, delivery instructions, postage amount, account identification, user identification, etc., to content server 120. Additionally or alternatively, user terminal 110 may interact with such web pages in order to generate, obtain, and print VBI for use in a postage meter indicia. Such interaction may include providing a visual example of the postage meter indicia being created (e.g., sample VBI), perhaps accompanied with associated data such as address information, for use in visualizing the printed product prior to its having been printed. Additionally, such interaction may include providing VBI to user terminal 110 for printing, perhaps accompanied with associated data such as address information, as a postage meter indicia.

Using style sheet based formatting control, such as is available using cascading style sheet (CSS) formatting, content provided to web browser 210 of embodiments of the invention is marked to apply to various input/output (I/O) devices. For example, using CSS formatting unprotected content 211, including sample VBI 241 and other content not provided protection according to embodiments of the present invention, is marked to apply only to the display while protected content 212, including actual VBI 242 and other content provided protection according to embodiments of the present invention, is marked to apply only to the printer. Therefore, although content 211 and 212 may be provided to web browser 210 in a same web page, only unprotected content 211 is displayed on monitor 112 (shown as displayed content 221). Moreover, although a user views sample VBI 241 (which is not a valid VBI for use as a postage meter indicia) on display 112, actual VBI 242 of protected content 212 is printed by printer 113 (shown as printed envelope 231).

According to embodiments, two style sheets may be utilized to provide the foregoing protection to content. A first such style sheet may be applicable with respect to unprotected content 211 to provide for the display of sample VBI 241, wherein actual VBI 242 and other protected content is marked as hidden in this style sheet. A second such style sheet may be applicable with respect to protected content 212 to provide for printing of actual VBI 242, wherein sample VBI 241 and other content not to be printed is marked as hidden in this style sheet. Accordingly, when a user invokes the web browser native print function (e.g., FILE PRINT), the second style sheet causes sample VBI 241 to be hidden from the output provided to printer 113 and actual VBI 242 is provided to printer 113. Although actual VBI 242 is present in the content of a web page provided to web browser 210, this VBI is not displayed to the user and thus opportunity for undesired activity with respect to the VBI (e.g., electronic copying into a clipboard, manipulating text or image data, etc.) is reduced.

It should be appreciated that content in addition to content for which protection according to embodiments of the present invention is desired may be included with respect to output provided by the aforementioned second style sheet. For example, it may be desired to print unprotected content, such as address information, in association with a VBI. Such unprotected content may therefore be included as content applying to the printer output in the second style sheet. Content included for output by the various style sheets utilized according to embodiments of the present invention may overlap. For example, the aforementioned address information may be identified for output to monitor 112 in the first style sheet and identified for output to printer 113 in the second style sheet, if desired.

Embodiments of the invention implement executable code or an executable object within a web page provided to web browser 210 to control access to content. According to an embodiment, client-side scripting language, such as JAVASCRIPT available from Sun Microsystems, is used with respect to web page content provided to web browser 210 in order to replace particular content upon printing. For example, a web page (shown as displayed content 221) may be built to contain sample VBI 241, without actual VBI 242. If the user utilizes native web browser print control (e.g., FILE PRINT), sample VBI 241 will be provided to printer 113 for printing. In this embodiment, actual VBI 242 has not been provided to web browser 210 and thus is not available for printing by user terminal 110. However, in the illustrated embodiment executable code 243, defining a "print button" for presentation as part of displayed content 221, is provided as part of unprotected content 211. When a user actuates this print button (e.g., "clicks" the print button), executable code 243 of an embodiment replaces the source of sample VBI 241 image with a source for actual VBI 242. For example, unprotected content 211 may include a uniform resource locator (URL) identifying sample VBI 241 in database 122 and/or 132. When executable code 243 is activated, this URL may be replaced with a URL identifying actual VBI 242 in database 122 and/or 132, thereby providing protected content 212 to web browser 210.

According to a preferred embodiment, printing functionality of web browser 210 is invoked immediately upon protected content 212 being provided to web browser 210. For example, executable code 243 of a preferred embodiment invokes native print functionality of web browser 210 immediately after providing the URL identifying actual VBI 242 to web browser 210, thereby causing actual VBI 242 to be printed. After the print operation, executable code 243 preferably deletes or otherwise removes the URL identifying actual VBI 242 to web browser 210, perhaps restoring the URL of sample VBI 241, to thereby once again make actual VBI 242 unavailable to web browser 210.

The foregoing exemplary executable code results in a brief display of protected content in displayed content 221 during the printing operation. However, because other functions of web browser 210 are typically not available during such a print operation, the user is prevented from interacting in any way with actual VBI 242 during the brief period in which it is displayed. Moreover, actual VBI 242 is only provided to web browser 210 during the printing operation, thereby further providing protection with respect to this protected content. Because a source of the content is changed, rather than opening a new area, this embodiment is unlikely to experience issues with respect to firewalls and popup blocking applications. Separate areas (e.g., windows or pages) are utilized with respect to web browser 210 to control access to content according to embodiments of the invention. A web page may be built to contain unprotected content 211, which includes sample VBI 241 without actual VBI 242, for display as displayed content 221. If the user utilizes native print control functionality of web browser 210 (e.g., the FILE PRINT command), sample VBI 241 will be provided to printer 113 for printing. A link or button is preferably included in the page, such as by including executable code 243, in order to facilitate printing of actual VBI 242. For example, when such a button is clicked, a new area is preferably opened by accessing content of database 122 and/or 132. This new area will preferably include actual VBI 242.

The foregoing new area results in a brief display of protected content during the printing operation. However, because other functions of web browser 210 are typically not available during such a print operation, the user is prevented from interacting in any way with actual VBI 242 during the brief period in which it is displayed. In addition to actual VBI 242 only being provided to web browser 210 during the printing operation, client/server interaction for serving up the new area is preferably invoked, thereby facilitating a higher level of monitoring and/or control by content server 120 with respect to the protected content.

It should be appreciated that various techniques for protecting content may be used in combination according to embodiments of the invention. For example, style sheet based formatting control may be used in combination with executable code and/or the use of separate areas (e.g., windows or pages) in an embodiment wherein protected content is provided to the general purpose user interface application only when particular functionality is available (e.g., during a print operation), and even then operating to hide the protected content from particular media (e.g., providing the protected content for printing but not display).

The foregoing embodiments operate to provide protection to content from access, copying, manipulation, etc. by a user of the general purpose user interface application. However, a user may still attempt to perform multiple actions (e.g., printing) with respect to protected content using functionality of the general purpose user interface application and/or executable code or links provided according to embodiments of the invention. Accordingly, control techniques in addition to those associated with the client-side may be implemented in providing protection of content according to embodiments of the invention. For example, a combination of client-side techniques and server-side techniques may be utilized in restricting activity with respect to protected content, such as to limit printing of the protected content to one-time only. According to embodiments of the invention, when a button or link is selected within web browser 210 for printing actual VBI 242 (e.g., executable code 243 is initiated), access to database 122 and/or 132 to either source actual VBI 242 or open a new area including actual VBI 242 will be monitored by content server 120. According to preferred embodiments, subsequent attempts to obtain actual VBI 242 through repeated initiation of the aforementioned button or link will provide sample VBI 241 instead of VBI 242. Embodiments may allow subsequent access to actual VBI 242 in limited circumstances, such as where a misprint has occurred.

Using the foregoing techniques, general purpose user interface applications, such as web browsers in wide use today, may be utilized to access and process content, such as VBI used in postage metering applications, for which protection from unfettered copying, printing, etc. is desired. Although it may still be possible to gain access to content provided to general purpose user interface applications according to embodiments of the present invention, typical users will be prevented from readily accessing such content. Moreover, such users will be prevented from unwittingly or accidentally misusing such content, such as through accidental reprinting or copying the content without realizing that such copying is forbidden. Other mechanisms may be relied upon to prevent users determined to misuse such protected content from such misuse. For example, IBI utilized by the USPS facilitates validation of individual postage indicia, and thus may be used to prevent fraud with respect to VBI. However, such validation is typically done during after mail items have entered the mail processing stream. Although identifying invalid postage indicia, it may not be possible to identify the perpetrator or even the reason for the fraud. Accordingly, protection of content as provided herein, used in conjunction with such other protection mechanisms, provides valuable protection with respect to such content in addition to facilitating the use of general purpose user interface applications with respect to such content.

Embodiments of the present invention, or portions thereof, may be embodied in program or code segments operable upon a processor-based system (e.g., user terminal 110 and/or content server 120) for performing functions and operation as described herein. The program or code segments making up the various embodiments of the present invention may be stored in a computer-readable medium, which may comprise any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

EXEMPLARY POSTAL TRACKING EMBODIMENTS

In an exemplary embodiment of the present invention, a CONFIRM® Service subscriber obtains at least one subscriber identifier, such as by, among other things, paying the appropriate CONFIRM® Service subscription fee.

The exemplary CONFIRM® Service subscriber then resells CONFIRM® Service access to low volume individual mailers. Depending on the number of customers that use the exemplary CONFIRM® Service subscriber's services, the exemplary CONFIRM® Service subscriber may obtain a plurality of subscriber identifiers.

The exemplary mail piece tracking provider described herein is a CONFIRM® Service subscriber reseller. It will be understood by someone with ordinary skill in the art that the exemplary CONFIRM® Service subscriber reseller mail piece tracking embodiment of the present invention is illustrative and non-limiting, and that embodiments of the present invention will be equivalently applicable to non-reseller embodiments.

Figure 2B:
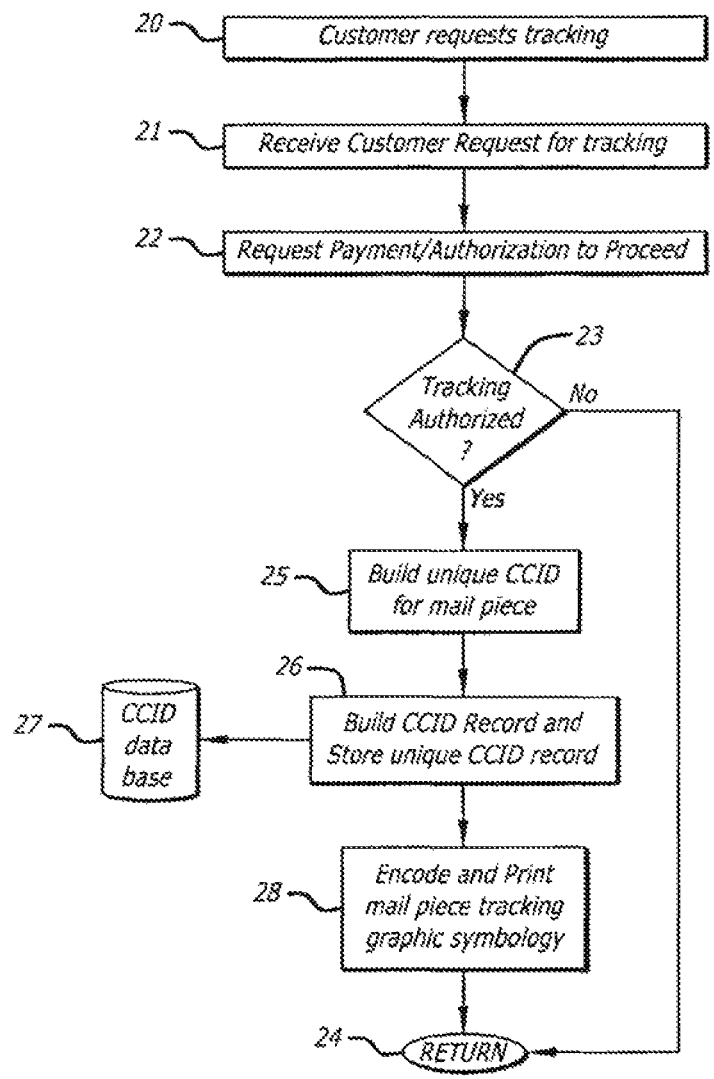
FIG. 2B is a high level logic flow diagram depicting an exemplary process for building and storing a unique (or substantially unique, or relatively unique) mail piece tracking identifier in an exemplary embodiment of the present invention.

FIG. 2B is a high level logic flow diagram depicting an exemplary process for building and storing a unique (or substantially unique, or relatively unique) mail piece tracking identifier in an exemplary embodiment of the present invention. As depicted in function block 20 of FIG. 2B, a customer of the exemplary CONFIRM® Service subscriber reseller mail piece tracking provider requests that a particular mail piece be tracked. For each such mail piece requested by a customer to be tracked, the exemplary CONFIRM® Service subscriber reseller mail piece tracking provider computer system receives the customer's request, as depicted in function block 21 of FIG. 2B, and will request from the customer payment and authorization to proceed, as depicted in function block 22 of FIG. 2B, before proceeding to build a unique (or substantially unique, or relatively unique) mail piece tracking identifier.

Exemplary embodiments of the present invention described herein are an Internet application of the present invention. It will be understood by someone with ordinary skill in the art that the exemplary Internet embodiment of the present invention is illustrative and non-limiting, and that embodiments of the present invention will be equivalently applicable to non-Internet embodiments, including but not limited to, PC-based systems.

An exemplary embodiment of the present invention is implemented in an online Internet-based (or PC-based) postage system. The United States Postal Service (USPS) provides the Information Based Indicia Program (IBIP.) The IBIP facilitates PC-based (Personal Computer based) Postage, also sometimes referred to as computer-based, or Internet-based, Postage. With PC Postage, a user can purchase postage credit, and print the postage in the form of PC Postage onto a label or directly onto a mail piece. A PC Postage label provides a human-readable portion and a 2-dimensional barcode portion. The human-readable portion includes the postage value, mail class, the date, and optionally a logo. The barcode portion is intended to help thwart fraud, and includes information about the mail piece including the destination ZIP code, the amount of postage applied, the date and time the postage was applied, and a digital signature so that the USPS can validate the authenticity of the postage.

In one exemplary embodiment of PC Postage, a user subscribes to a third party Internet postage provider, such as, for example, Stamps.com (of Santa Monica, Calif), and by using postage software made available by the Internet postage provider, postage value can be downloaded to the user's computer. The user can then print the postage indicia, by an ordinary laser or ink jet printer, directly onto the mail piece itself (e.g. onto business envelopes), onto a label to be applied to the mail piece, or alternately on an insert that can be placed into a window envelope so that it will show through a window envelope. Such postage software preferably works in conjunction with other software programs, such as word processing, accounting, database, and contact management software to allow a user to conveniently print PC Postage at the same time that addressee and bar code information is printed, and, in some cases of envelope printing, at the same time as the sender's return address is printed.

An example of a computer-based postage system is a software-based, online postage system described in U.S. patent application Ser. No. 09/163,993 filed on Sep. 29, 1998, by Mohan Ananda, entitled "On Line Postage System," the contents of which are hereby incorporated by reference as if set forth in full. The online postage system software comprises user code, also sometimes referred to as client software, that resides on a client system, and controller code, also sometimes referred to as server software, that resides on a server system. An exemplary on-line postage system may comprise a user system electronically connected to a server system, which in turn is connected to a USPS system. The server system is preferably capable of communicating with one or more client systems simultaneously.

It will be understood by someone with ordinary skill in the art that embodiments of the present invention would be equivalently applicable in contexts other than an Internet-based tracking service provider, including, but not limited to, other PC- and computer-based systems.

Figure 1B:
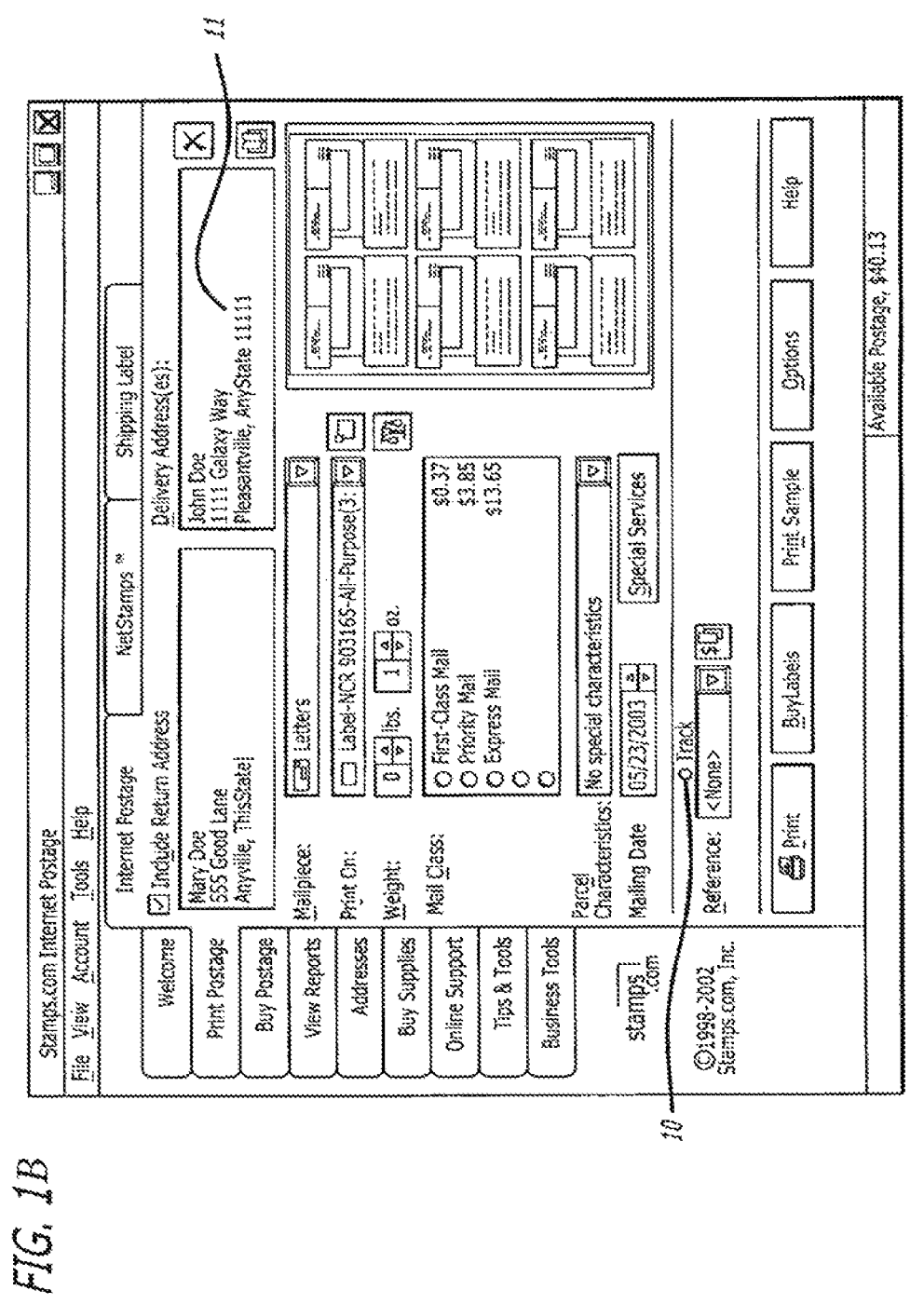

FIG. 1B is a graphic representation depicting an exemplary graphical user interface for obtaining a customer's request to track a particular mail piece. In the exemplary interface depicted in FIG. 1B, the customer requests that a particular mail piece for which the customer is printing Internet FIRST-CLASS postage be tracked by clicking an onscreen tracking option button 10.

It will be understood by someone with ordinary skill in the art that there are many ways and formats with which to capture a customer's online request for a service, varying from pull down menus of selectable services, to clicking or otherwise indicating a particular option presented on a graphical user interface; the exemplary graphical user interface is illustrative and non-limiting.

In an exemplary embodiment, when a customer requests that a particular mail piece be tracked, a unique (or substantially unique, or relatively unique) identifier is then assigned to the particular mail piece. The exemplary unique (or substantially unique, or relatively unique) mail piece identifier comprises a specially assigned combination of a POSTNET Code and a PLANET™ CODE such that, for a defined period of time, the POSTNET Code is unique (or substantially unique, or relatively unique, such as within a particular period of time) within the PLANET™ Code. This exemplary unique (or substantially unique, or relatively unique) mail piece identifier is referred to herein as a "composite confirm ID" or "CCID."

PLANET™ Codes are 12- or 14-digit codes and can be represented as barcodes such as a one-dimensional barcode. The first two digits of a PLANET™ Code represent the type of CONFIRM® service: Destination CONFIRM® or Origin CONFIRM®.

For Destination CONFIRM®, the next 9, or 11, digits of the PLANET™ Code comprise a 5-digit Subscriber ID that is a unique identifier of the particular CONFIRM® subscriber and a 4-, or 6-, digit field defined by the particular mailer to identify the actual mailing. The $12^{th}$, or $14^{th}$, digit of the PLANET™ Code is a check-sum digit for error detection.

A POSTNET Code comprises a 5-digit ZIP code and, if the particular delivery address can be found in a postal address database, a 4-digit area code, and a 2-digit delivery address code. If the particular delivery address cannot be found in the postal address database, then, as long as the city, state and ZIP code of the delivery address are otherwise valid, the POSTNET Code comprises only the 5-digit ZIP code.

In an exemplary embodiment, the POSTNET Code for the exemplary POSTNET Code unique (or substantially unique, or relatively unique) mail piece identifier is populated by the Internet Postage system with the appropriate 5-digit ZIP code, 4-digit area code, and 2-digit delivery address code fields obtained by the Internet Postage system in response to the customer's input of a delivery address 11.

In order for the composite confirm ID to uniquely (or substantially uniquely, or relatively uniquely) identify a particular mail piece, the composite confirm ID needs to be unique (or substantially unique, or relatively unique) for a time period that is at least as long as, or exceeds, the time expected to be required for the mail piece to be delivered, and scanned. In an exemplary embodiment of the present invention, the uniqueness (or relative uniqueness) time period will be set to 30, 60, 90 days, or for certain types of mail, permanent.

It will be understood by someone with ordinary skill in the art that the composite confirm ID (CCID) need not necessarily include the entire POSTNET Code to uniquely (or substantially uniquely, or relatively uniquely) identify a mail piece. It is possible to use less than the full POSTNET Code to construct a unique (or substantially unique, or relatively unique) mail piece identifier. For example, 1, 2 or more digits of the POSTNET Code could be used to construct a unique (or substantially unique, or relatively unique) CCID. The number of digits of the POSTNET Code that would be needed to construct a unique (or substantially unique, or relatively unique) CCID mail piece identifier would depend on circumstances regarding a particular CONFIRM® Service subscriber and the number of its customers.

As briefly previously mentioned above, the exemplary mail piece tracking provider is itself a CONFIRM® Service subscriber. As a CONFIRM® Service subscriber, the exemplary mail piece tracking provider registers with the U.S. Postal Service to obtain one or more subscriber identifiers (subscriber IDs). For non-limiting illustrative purposes only, three (3) exemplary subscriber IDs will be described herein, namely "01", "02" and "03." It will be understood by someone with ordinary skill in the art that more or less subscriber IDs could be used without departing from the spirit of the invention.

Continuing with FIG. 2B, when a customer of the exemplary mail piece tracking provider requests 20 that a particular mail piece be tracked, the exemplary Internet Postage computer system receives 21 the tracking request and charges 22 the customer, such as through a pre-established account balance, an amount of money appropriate for the tracking of the particular mail piece. The system checks in step 23 to determine whether or not tracking is authorized. If the customer declines to pay for the tracking service, the system returns 24 to its other processing. If the customer has paid the requested amount, such as, e.g., by indicating (e.g., clicking on an online print button on a user interface (not shown)) authorization of the printing of an Internet Postage stamp and a tracking label, then the exemplary Internet Postage computer system builds 25, and assigns to the particular mail piece, a unique (or substantially unique, or relatively unique) composite confirm ID (CCID) and stores 26 the assigned unique (or substantially unique, or relatively unique) composite confirm ID, with other information described in more detail below, in a memory 27, such as in a database or lookup table. The memory storage of the assigned CCIDs is sometimes referred to herein, for non-limiting illustrative purposes, as the "CCID database" 27.

Once the system has built and assigned a unique (or substantially unique, or relatively unique) CCID to the particular mail piece, the system then encodes the CCID and prints 28 a mail piece tracking graphic symbology, that can be applied to the particular mail piece and that can then be scanned, or otherwise read and/or recorded electronically, by the U.S. postal service. The general way in which data is encoded for printing as a graphic symbology is well known in the art. The particular requirements for encoding and printing a U.S. Postal CONFIRM® identifier is prescribed in U.S. Postal Service *Publication* 197, previously incorporated by reference herein for all purposes.

After encoding and printing 28 the mail piece tracking graphic symbology, the system returns 24 to its other processing.

Figure 3A:
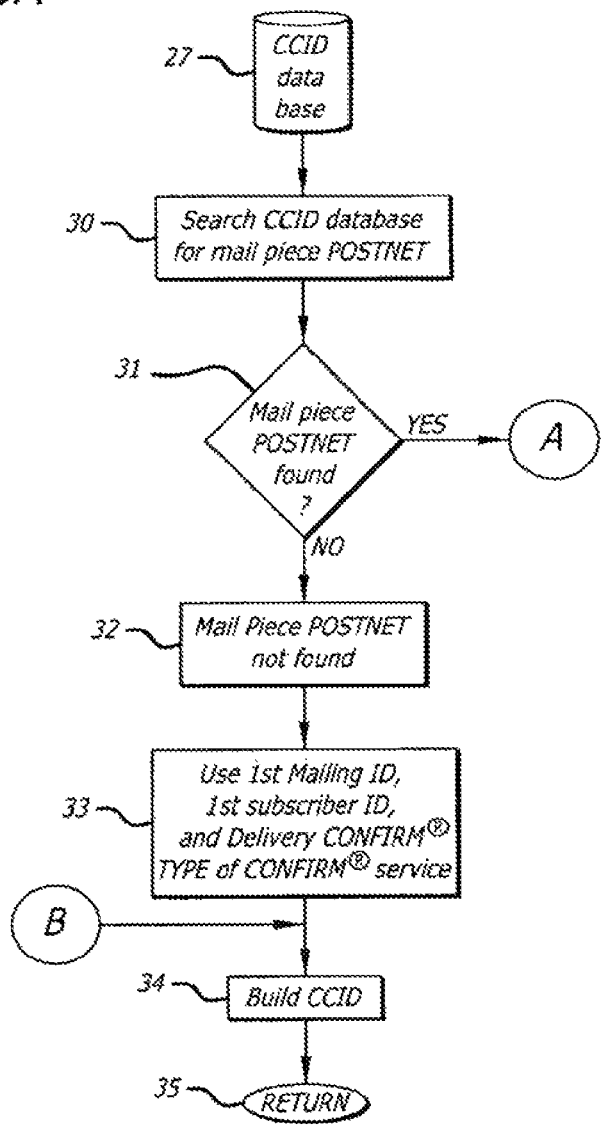
FIGS. 3A and 3B are high level logic flow diagrams depicting an exemplary process for building a unique (or substantially unique, or relatively unique) mail piece tracking number in an exemplary embodiment of the present invention.
Figure 3B:
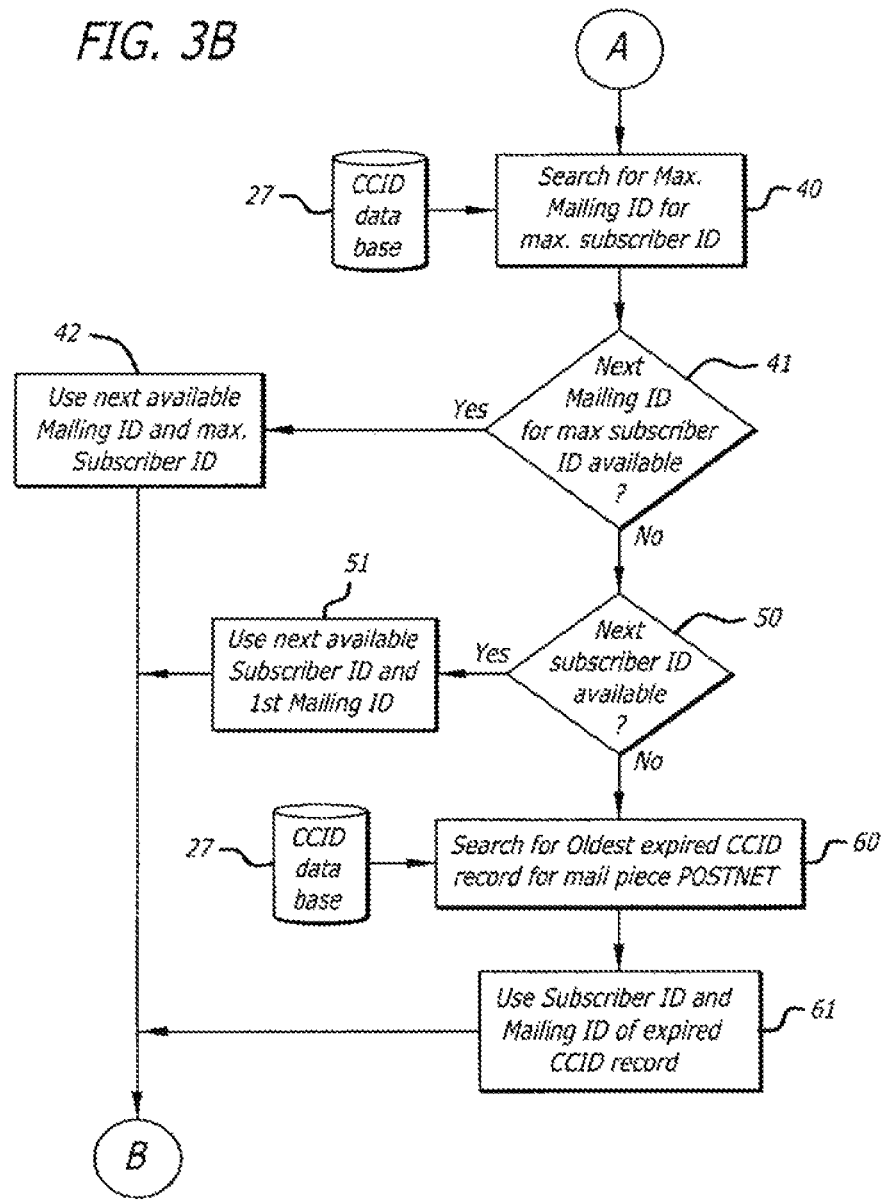

FIGS. 3A and 3B are high level logic flow diagrams depicting in more detail an exemplary process for building (element 25 in FIG. 2B) a unique (or substantially unique, or relatively unique) mail piece tracking number in an exemplary embodiment of the present invention. In order for the composite confirm ID to uniquely (or substantially uniquely, or relatively uniquely, such as during a particular period of time) identify a particular mail piece, the exemplary Internet Postage computer system first searches 30 the CCID database 27 for a previously assigned composite confirm ID with the same POSTNET Code as the POSTNET Code of the particular mail piece for which tracking has been requested by the customer. That is, the exemplary Internet Postage computer system uses the POSTNET Code of the particular mail piece for which tracking has been requested by the customer as a lookup key.

In one alternative embodiment, instead of using only the POSTNET Code as the lookup key, a combination of POSTNET Code and mail class/service type code is used as a lookup key.

Continuing with FIGS. 3A and 3B, the exemplary Internet Postage computer system tests (test step 31, FIG. 3A) whether or not the mail piece POSTNET was found. If the POSTNET Code (or in the alternative embodiment, the combination of the POSTNET Code and mail class/service type code) does not exist 32 in the CCID database 27, then the exemplary Internet Postage computer system uses (in step 33) the first Mailing ID ("000001") and the first subscriber ID ("00001") to build 34 the unique (or substantially unique, or relatively unique) composite confirm ID (CCID). The system then returns 35 to its other processing.

In the case in which the POSTNET Code (or in the alternative embodiment, the combination of the POSTNET Code and mail class/service type code) does not exist in the CCID database, in order to build the unique (or substantially unique, or relatively unique) CCID, the exemplary Internet Postage computer system sets a first field (referred to herein as the "CCID type of CONFIRM® service") to a value designating that the CONFIRM® service type is "Destination" CONFIRM®. In the exemplary embodiment, the CCID type of CONFIRM® service field is a 2-digit field.

In the case in which the POSTNET Code (or in the alternative embodiment, the combination of the POSTNET Code and mail class/service type code) does not exist in the CCID database, in order to further build the unique (or substantially unique, or relatively unique) CCID, the exemplary Internet Postage computer system sets a second field (referred to herein as the "CCID subscriber ID") in the CCID to a first subscriber ID, e.g., "00001". In the exemplary embodiment, the CCID subscriber ID is a 5-digit field.

The exemplary Internet Postage computer system sets a third field (referred to herein as the "CCID mailing ID") in the CCID to a first mailing ID, e.g., "000001". In the exemplary embodiment, the CCID mailing ID is a 6-digit field. In an alternative embodiment, the CCID mailing ID could be a 4-digit field.

The exemplary Internet Postage computer system sets a fourth field (referred to herein as the "CCID POSTNET") in the CCID to the POSTNET Code of the particular mail piece for which the customer has requested tracking. In the exemplary embodiment system, the customer mailer will have requested and paid for an Internet-based postage-indicia-bearing label to be printed with which to mail the particular mail piece. In those instances in which the customer mailer has provided the delivery address for the particular mail piece in order for the system to prepare the Internet-based postage-indicia-bearing label for the mail piece, the system will use the Internet-based postage-indicia-bearing label delivery address information supplied by the customer mailer with which to populate the CCID POSTNET.

In the alternative exemplary embodiment in which the lookup key includes both the POSTNET Code and the mail class/service type code, the exemplary alternative Internet Postage computer system would also set a fifth field (referred to herein as the "CCID service type") in the CCID to the mail class/service type of the mail piece for which the customer has requested tracking.

Once the exemplary Internet Postage computer system (sometimes referred to herein as the "system") has built a CCID, such as is depicted in function blocks 33-34 of FIGS. 3A-3B, to uniquely (or substantially uniquely, or relatively uniquely, such as during a particular period of time) identify the mail piece to be tracked, the system builds a CCID record, as depicted in function block 26 in FIG. 2B, for storage in the CCID database 27.

In building (function 26, FIG. 2B) the CCID record, the system assigns a permanently unique "Print ID" to the just-built CCID and associates the Print ID with an identifier of the particular customer that requested tracking of the particular mail piece. The system then populates the CCID database record for storage with the following information: Print ID, CCID, Customer ID/Meter No., mailing date, time period required for uniqueness (or relative uniqueness), print date (optional in some embodiments), amount of postage (optional in some embodiments), tracking fee (optional in some embodiments), and Mail Class/Service Type (optional in some embodiments). In one alternative embodiment, instead of storing in each CCID database record, a time period during which the CCID must remain unique (or substantially unique, or relatively unique), the system would store an expiration date. Once the CCID database record has been built, the system stores the CCID database record in the CCID database.

As will be understood by someone with ordinary skill in the art, the above-identified data fields, in what is referred to herein as the CCID database record, are exemplary and non-limiting. In alternative embodiments, the CCID database record may contain links to other databases or tables in order to link the particular CCID database record to a particular customer.

In one alternative exemplary embodiment, in building (function 26, FIG. 2B) the CCID record to be saved on the CCID database 27, the system would include in the CCID record an indication of the computer-based IBIP postage indicia data corresponding to the particular mail piece. In some such embodiments, the CCID record in the CCID database 27 may actually contain the computer-based postage indicia data; in other such embodiments, the CCID record in the CCID database 27 may contain a link or cross-reference to the computer-based postage indicia data.

Someone with ordinary skill in the art will understand that computer-based IBIP postage is one type of Value Bearing Item ("VBI"). Value Bearing Items ("VBI" or value-bearing items) include, among other things, postage, coupons, tickets, gift certificates, currency, money orders, vouchers and the like.

As will be understood by someone with ordinary skill in the art, there are different types of computer-based IBIP postage. One type of computer-based IBIP postage is recipient-address specific and is date sensitive/date specific. Another type of computer-based IBIP postage is "generic" in that it is neither recipient-address specific nor date sensitive/date specific.

As a non-limiting example, an embodiment is described herein below with respect to generic computer-based IBIP [VBI] postage. However, as will be understood by someone with ordinary skill in the art, various alternative exemplary embodiments may be implemented with respect to either or both generic and/or non-generic computer-based IBIP postage.

U.S. patent application Ser. No. 09/975,532 entitled "SYSTEM AND METHOD FOR PROVIDING COMPUTER-BASED POSTAGE STAMPS" (hereinafter referred to as the "Generic VBI Invention"), the entire contents and disclosures of which are incorporated in full herein, discloses systems and methods for the creation of generic computer-based IBIP [VBI] postage, such that no intended recipient address need be specified, verified or indicated in any way on the created postage. The systems and methods disclosed in the Generic VBI Invention provided for the generation and printing of generic VBI, such as generic computer-based IBIP postage, that may be used at any time for any recipient, much like pre-printed postage printed and sold by the United States Postal Service ("USPS"). The terms "generic postage," "generic VBI postage," "generic Internet postage", "generic computer-based IBIP postage" and "computer-based postage" are used synonymously herein to refer to postage that is non-recipient specific and/or non-date specific.

In one such alternative exemplary embodiment, a set of full, digitally-signed, computer-based postage indicia data would be assigned to the mail piece.

In such an alternative exemplary embodiment, an Internet postage "vault" server would generate a set of full, digitally-signed, generic, computer-based postage indicia data for each mail piece postage indicia label. Each set of full, digitally-signed, generic, computer-based postage indicia data may comprise a number of elements, including, for example: an Indicia Version Number (a version number assigned by the USPS to the indicia data set), an Algorithm identifier (that identifies the digital signature algorithm used to create the digital signature in the indicium), a Certificate Serial Number (that represents the unique serial number of the PSD ("Postal Security Device") certificate issued by the IBIP Certificate Authority), a Device identifier PSD Manufacturer identifier (a USPS-assigned identifier for each provider), a Device identifier Model identifier (a provider's model number for the PSD), Device Identifier PSD Serial Number (a provider-assigned serial number for the PSD), Ascending Register (total monetary value of all indicia ever produced during the life cycle of the PSD), Postage (amount of postage for the particular mail piece or postage label), Date of Creation, Registration Post Office City State and Zip code, a postage label identifier (such as a serial number or such as a unique (or substantially unique, or relatively unique) serial number), Software identifier (host system software identification number), Descending register (the postage value remaining on the PSD after the amount of the postage for the particular postage label has been deducted), rate category (a postage class and rate), a digital signature, and other fields.

In one such alternative, exemplary embodiment, the CCID record would be built to comprise the set of full, digitally-signed, generic, computer-based postage indicia data.

It will be understood by someone with ordinary skill in the art that the contents of a set of full, digitally-signed, generic, computer-based postage indicia data and/or full, digitally-signed, computer-based postage indicia data, may vary from one embodiment to another.

In exemplary embodiments described herein, full, digitally-signed indicia data is sometimes referred to as full, digitally-signed, generic, computer-based postage indicia data. However, it will be understood by someone with ordinary skill in the art that embodiments of the present invention apply to value-bearing items for which full, digitally-signed indicia data, whether generic or not, was created, and for which the value-bearing item bears an indication of a subset, or otherwise derived version, of the full, digitally-signed indicia data.

FIG. 14 is a chart depicting exemplary content format for exemplary full, digitally-signed, generic machine-readable postage indicia data in the alternative exemplary embodiment of the present invention.

It will be understood by someone with ordinary skill in the art that exemplary full, digitally signed, generic Internet postage indicia may comprise a number of elements, including, for example the exemplary fields depicted in FIG. 14, including, for example: an Indicia Version Number (a version number assigned by the USPS to the indicia data set) 1401, an Algorithm identifier (that identifies the digital signature algorithm used to create the digital signature in the indicium) 1402, a Certificate Serial Number (that represents the unique serial number of the PSD ("Postal Security Device") certificate issued by the IBIP Certificate Authority) 1403, an IBI Vendor Identifier 1404 such as a Device identifier PSD Manufacturer identifier (a USPS-assigned identifier for each provider), a Device identifier Model identifier (a provider's model number for the PSD) such as a PSD Model Number 1405, a Device Identifier PSD Serial Number (a provider-assigned serial number for the PSD) 1406, Ascending Register (total monetary value of all indicia ever produced during the life cycle of the PSD) 1407, Postage Value (amount of postage for the particular mail piece or postage label) 1408, Date of Creation 1409, Originating Zip Code 1410 (or Registration Post Office City State and Zip code), Software Identifier (host system software identification number)1411, unique (or substantially unique or relatively unique) postage label identifier (such as a serial number, or a combination of a label sheet identifier 1412 and a label identifier 1413), Descending register (the postage value remaining on the PSD after the amount of the postage for the particular postage label has been deducted) 1414, a mail or rate category (a postage class and rate) 1415, a digital signature 1416, and possibly other additional or alternative fields.

The exemplary full, digitally signed, generic Internet postage indicia data elements depicted in FIG. 14 comprise an exemplary total of eighty-nine (89) bytes of data. As will be understood by someone with ordinary skill in the art, the exemplary eighty-nine (89) bytes of data composition of exemplary full, digitally signed, generic Internet postage indicia data is illustrative and not a limitation of the present invention.

In another such alternative, exemplary embodiment, an exemplary set of computer-based derivative postage indicia data would be built and would be indexed, or cross-referenced to, or otherwise related to, the exemplary set of full, digitally-signed, generic, computer-based postage indicia data. Building an exemplary set of computer-based derivative postage indicia data (some embodiments of which are sometimes referred to as "IBI Lite" postage indicia) and mapping (indexing/cross-referencing or otherwise creating an indication of a relationship between) the exemplary set of computer-based derivative postage indicia data to the corresponding exemplary set of full, digitally-signed, generic, computer-based postage indicia data is disclosed in U.S. patent application Ser. No. 10/994,768, filed on Nov. 22, 2004, entitled "COMPUTER-BASED VALUE-BEARING ITEM CUSTOMIZATION SECURITY", now U.S. Pat. No. 7,243,842; Issued Jul. 17, 2007, the entire disclosures and contents of which have been previously above incorporated in full by reference for all purposed as if fully stated here.

It will be understood by someone with ordinary skill in the art that reference herein to storing, building a record of, receiving a record of, sending, or the like, with regard to postage indicia may include a reference to postage indicia data.

As compared to the large number of fields (the exemplary eighty-nine (89) bytes) described above for an exemplary set of full, digitally-signed generic Internet postage indicia data, a set of exemplary IBI Lite postage indicia data would contain an exemplary subset or other derivation of the exemplary set of full, digitally-signed generic Internet postage indicia data. For example, one exemplary set of derivative IBI Lite postage indicia data may comprise, for example, only twenty (20) bytes of data.

Exemplary IBI Lite postage indicia data fields are depicted in FIG. 7. As depicted in FIG. 7, exemplary IBI Lite postage indicia data fields would comprise, for example, an exemplary twenty (20) bytes of data, comprising an exemplary 1-byte IBI standard Indicia Version number 441, an exemplary 2-byte Software ID 442, an exemplary 3-byte Postage Value 443, an exemplary 2-byte IBI Vendor number 444, an exemplary 2-byte Model ID 445, an exemplary 8-byte (12-digit) Indicia ID (e.g., serial) number 446 (that will, in exemplary embodiments, be mapped/indexed/cross-referenced to, or otherwise serve as a key to, the full, digitally-signed generic Internet postage indicia), and an exemplary 2-byte field containing Encoder values 447. In an exemplary embodiment, the exemplary IBI Lite postage indicia data would be encoded for printing, or for print rendering, as a machine-readable postage indicia using a Data Matrix 2D barcode generator, such as, by way of a non-limiting example, from IDAutomation, Inc.; the exemplary Data Matrix 2D barcode format will be twenty (20) byte rectangular, with twenty (20) mil element size. Data Matrix barcodes are described in, for example, *ANSI/AIM BC*11 *International Symbology Specification*, "Data Matrix." Use in the alternative exemplary embodiment of a Data Matrix 2D barcode is exemplary and non-limiting; other ways of encoding exemplary IBI Lite postage indicia data for printing or print rendering may comprise any other type of machine-readable representation, whether now known or in the future discovered.

It will be understood by someone with ordinary skill in the art that the above-described exemplary contents of exemplary IBI Lite postage indicia data fields is illustrative and not a limitation of the present invention. FIG. 15 is a chart depicting alternative exemplary IBI Lite content and content format for alternative exemplary machine-readable IBI Lite postage indicia data in a further alternative exemplary embodiment of the present invention.

The alternative exemplary IBI Lite postage indicia data depicted in FIG. 15 shares some exemplary fields in common with the previously discussed exemplary IBI Lite postage indicia data depicted in FIG. 7, namely, an exemplary 1-byte Indicia Version Number 441 and an exemplary 3-byte Postage Value 443. The other exemplary fields of the alternative exemplary IBI Lite postage indicia data depicted in FIG. 15 comprises an exemplary 4-byte Piece Counter 1501, an exemplary 1-byte IBI Vendor/Model identifier 1502, an exemplary 3-byte PSD Serial Number, an exemplary 2-byte Intelligent Mail Service identifier, and an exemplary 6-bytes total of fields reserved 1505 and 1506. Including the reserved fields 1505 and 1506, the alternative exemplary IBI Lite postage indicia data depicted in FIG. 15 comprises a total of 20 bytes of data. The exemplary 1-byte IBI Vendor/Model identifier 1502 is shortened from the Vendor ID and Model ID fields depicted in FIG. 14 for full, digitally-signed, generic postage indicia data. Rather, the high-order nibble of the exemplary 1-byte IBI Vendor/Model Identifier 1502 is assigned a Vendor identifier, and the low-order nibble of the exemplary 1-byte IBI Vendor/Model Identifier 1502 is assigned a Model identifier.

Returning with reference to FIG. 7, in an exemplary alternative embodiment, the serial number, element 446 depicted in FIG. 7 will be used as a key to the corresponding full, digitally-signed generic Internet postage indicia data. In an exemplary alternative embodiment, a record comprising the serial number, e.g., element 446 depicted in FIG. 7, and the corresponding full, digitally-signed generic Internet postage indicia data will be saved in a database such as element 1220 depicted in FIG. 8. That is, there will be a mapping between the IBI Lite postage indicia data and the corresponding full, digitally-signed generic Internet postage indicia data because the IBI Lite postage indicia data will comprise the serial number (e.g., 446 depicted in FIG. 4), and because the serial number (e.g., 446 depicted in FIG. 4) will be a key to the corresponding full, digitally-signed generic Internet postage indicia data.

In further alternative embodiments, other data, as compared to, or in combination with, the serial number, could be used as a key to the corresponding full, digitally-signed generic Internet postage indicia data. For example, in one alternative, exemplary embodiment, the entire IBI Lite postage indicia (encoded in machine readable form) could be used as a key to the corresponding full, digitally-signed generic Internet postage indicia data. In one exemplary alternative embodiment, an exemplary alternative CCID record would comprise, for example, the previously above-mentioned information (i.e., Print ID, CCID, Customer ID/Meter No., mailing date, time period required for uniqueness (or relative uniqueness), print date (optional in some embodiments), amount of postage (optional in some embodiments), tracking fee (optional in some embodiments), and Mail Class/Service Type (optional in some embodiments)), and would further comprise the IBI Lite postage indicia data, which would comprise the above-mentioned serial number for the mail piece, and alternatively, could further comprise the corresponding full, digitally-signed generic Internet postage indicia.

Further, in an exemplary alternative embodiment, the IBI Lite postage indicia data will be an alternative key to the CCID record. Reasons for providing the IBI Lite postage indicia data as an alternative key to the CCID record will be used to facilitate more chances to track a mail piece and will be described in more detail below.

It will be understood by someone with ordinary skill in the art that the data used as a key to corresponding full, digitally-signed, generic postage indicia data and/or to the CCID record is not a limitation of the present invention. Other fields could be used as a key without departing from the spirit of the present invention. For example, In a further alternative exemplary embodiment, the lookup key could comprise, for example, the exemplary Piece Counter 1501 in combination with the exemplary 3-byte PSD Serial Number 1503 as depicted in FIG. 15. As a further alternative, a lookup key could comprise, for example, the exemplary Piece Counter 1501 in combination with the exemplary 3-byte PSD Serial Number 1503 and the IBI Vendor/Model identifier 1502 as depicted in FIG. 15. It will be understood by someone with ordinary skill in the art that the various exemplary lookup key contents described above are illustrative and not a limitation of the present invention.

Returning to an exemplary embodiment depicted in FIGS. 3A-3B, if the POSTNET Code (or in the alternative embodiment, the combination of the POSTNET Code and mail class/service type code) already exists in the CCID database 27, then the exemplary Internet Postage computer system must first determine the next available unique (or substantially unique, or relatively unique) combination of the subscriber ID and Mailing ID in order to build the unique (or substantially unique, or relatively unique) composite confirm ID (CCID).

In order to determine the next available unique (or substantially unique, or relatively unique) combination of the subscriber ID and Mailing ID, the system will search 40 for the CCID database record for the given POSTNET Code (or in the alternative embodiment, the combination of the POSTNET Code and mail class/service type code) with the highest (maximum) subscriber ID and the highest (maximum) Mailing ID. Depending on the computer language and database technology used, the search may be initiated by an instruction to give the CCID database record with the lookup POSTNET Code (or in the alternative embodiment, the combination of the lookup POSTNET Code and mail class/service type code) having the maximum subscriber ID and the maximum Mailing ID.

Once the system returns the CCID database record with the lookup POSTNET Code (or in the alternative embodiment, the combination of the lookup POSTNET Code and mail class/service type code) having the maximum subscriber ID and the maximum Mailing ID, the system determines 41 whether the next Mailing ID is available for the maximum subscriber ID. If the next Mailing ID is available for the maximum subscriber ID, the system then uses 42 the next available (next increment of) Mailing ID for that maximum subscriber ID to build 34 the unique (or substantially unique, or relatively unique) CCID, and then returns 35 to the system's other processing.

If the next available Mailing ID exceeds the maximum allowable number (in an exemplary embodiment, "999999"), and the next available Mailing ID is "000001", the system then determines 50 whether the next subscriber ID is available. If the next subscriber ID is available, the system then uses 51 the next available subscriber ID and the first ("000001") Mailing ID for that subscriber ID and builds 34 the unique (or substantially unique, or relatively unique) CCID and then returns 35 to the system's other processing.

If when the system attempts to use the next available Mailing ID and subscriber ID, there are no more available Mailing IDs for existing subscriber IDs, then the system searches 60 for existing CCID database records for the lookup POSTNET Code (or in the alternative embodiment, the combination of the lookup POSTNET Code and mail class/service type code), for which the Mailing date for the particular mail piece to be tracked exceeds the expiration date for the CCID database record. The expiration date will be either stored in the CCID database record, or can be calculated by adding the time period required for uniqueness (or substantial uniqueness, or relative uniqueness) that is stored in the CCID database record to the mailing date that is stored in the CCID database record.

When an expired CCID database record is returned to the system in response to the search with the mail piece lookup POSTNET Code (or in the alternative embodiment, the combination of the lookup POSTNET Code and mail class/service type code), the system "recycles" the CCID (in function 61, FIG. 3B)—the system updates the returned expired CCID database record by populating the record with information about the new CCID and print event in order to build 34 the unique (or substantially unique, or relatively unique) CCID before returning 35 to the system's other processing.

The CCID conforms with the U.S. Postal Service's requirements for a U.S. Postal CONFIRM® service identifier, while at the same time, the CCID provides, for a defined period of time, mail-piece-level uniqueness (or substantial uniqueness, or relative uniqueness) for mail piece tracking.

As was previously described above with regard to FIG. 2B, once the system has built 25 a CCID and a CCID Record, and has stored 26 the CCID record on the CCID database 27, the system encodes the CCID for printing as a graphic symbology, and prints the graphic symbology. In an exemplary embodiment of the present invention, the CCID-encoded graphic symbology is a bar code. In an exemplary embodiment, the system prompts the customer mailer to request a final indication by the customer mailer that the customer mailer is ready for the system to print the graphic symbology. Once the exemplary embodiment system receives the customer mailer's go-ahead to print, an exemplary embodiment system prints 28 the CCID-encoded bar code on a label.

In an alternative exemplary embodiment of the present invention, an alternative approach is used to manage CCID life- and expiration-times. The alternative approach uses a first designated account group comprising a first set of subscriber IDs, e.g., subscriber ID 1, 2, and 3, for a designated first period of time, for example, 0-90 virtual relative calendar days. In this embodiment, a virtual relative calendar is used. According to the virtual relative calendar, the virtual relative calendar day is initialized to 0, and is then incremented by one for each real calendar day. During the first period of time, e.g., the first 90 virtual relative calendar days, of this alternative embodiment, the system would assign CCIDs with subscriber IDs from the first account group set of subscriber IDs, e.g., subscriber ID 1, 2, or 3. After the first period of time has expired, this alternative approach then uses a second designated account group comprising a second set of subscriber IDs, e.g., subscriber IDs 4, 5, and 6, for a designated second period of time, e.g., 91-180 virtual relative calendar days. During the second period of time, e.g., the 91-180 virtual relative calendar days, of this alternative embodiment, the system would assign CCIDs with subscriber IDs from the second account group set of subscriber IDs, e.g., subscriber ID 4, 5, or 6. After the second period of time expires, this alternative approach would then restart the virtual calendar to virtual relative calendar day zero and would begin again to assign CCIDs with subscriber IDs in the first account group.

It will be understood by someone with ordinary skill in the art that the description above of two account groups is illustrative and non-limiting; that the description above of each account group being comprised of three subscriber IDs is illustrative and non-limiting; and that the description above of a particular number of periods of time and of a particular number of days for each period of time is illustrative and non-limiting. More than two account groups could be used. Each account group could be comprised of more than three, or less than three, subscriber IDs. More than two periods of time could be used. And each time period could be set for more than 90 days, or less than 90 days. Further, each time period could be set for a different number of days relative to the number of days of each other time period.

In order to track the mail piece, before depositing the mail piece into the U.S. Postal Service mail stream, the customer mailer will affix the printed CCID-encoded bar code label to the mail piece on the delivery-address side of the mail piece in a position relative to the delivery address as specified and required by the U.S. Postal Service. An exemplary embodiment system instructs the customer mailer as to the proper placement of the CCID-encoded bar code label.

In an exemplary embodiment system, as described above, the customer mailer has requested and paid for the printing of one or more Internet-based postage-indicia-bearing labels, in some cases including a delivery address label, for affixing to the mail piece. In such case, the customer mailer will affix the Internet-based postage-indicia-bearing label(s), and, if applicable, the address label, and in some cases, a separate CCID-encoded bar code label.

In an exemplary alternative embodiment previously described above regarding the inclusion in the CCID record of the IBI Lite postage indicia data for the subject mail piece, the customer mailer would affix labels comprising printed computer-based IBI Lite postage indicia to the subject mail piece.

In some cases, instead of a single CCID-encoded bar code label, a label bearing a CCID PLANET™ Code barcode and another label bearing a CCID POSTNET Code barcode will be printed, depending on a label set configuration used by a customer mailer and designated to an exemplary embodiment system. It will be understood by someone with ordinary skill that, in yet other cases, the customer mailer could use alternative label set configurations and request printing of a postage-indicia-bearing label and a label bearing a CCID PLANET™ Code barcode; the address and POSTNET barcode could be pre-printed on a letter and visible through an envelope window, or could be printed directly on an envelope.

Once a mail piece bearing a graphic symbology encoding a CONFIRM® service ID has been deposited in the U.S. Postal Service mail stream, the U.S. Postal Service may scan the mail piece at various stages of processing. Each time a CONFIRM® service ID graphic symbology-bearing mail piece is scanned by the U.S. Postal Service, the scanned information, along with details about the scanning event, are electronically captured. Each scan of a mail piece results in the creation of a record containing the following information: Shipment ID, Postal Service facility, Facility ID (ZIP), Date of entry scan (in mm/dd/yyyy format), and time of entry scan (in hh:mm:ss format). The Shipment ID is the CONFIRM® service ID, which, in the case of a mail piece to which a customer mailer has prepared the CONFIRM® label using an exemplary embodiment system, comprises the CCID-encoded bar code label.

Scanned CONFIRM® data can be made available to each CONFIRM® subscriber in more than one way. According to U.S Postal Service *Publication* 197, the U.S. Postal Service can provide a subscriber with scanned CONFIRM® information though File Transfer Protocol (FTP). The U.S. Postal Service also makes scanned CONFIRM® information available via password-protected access of a Web site, www.planetcodes.com.

Figure 4:
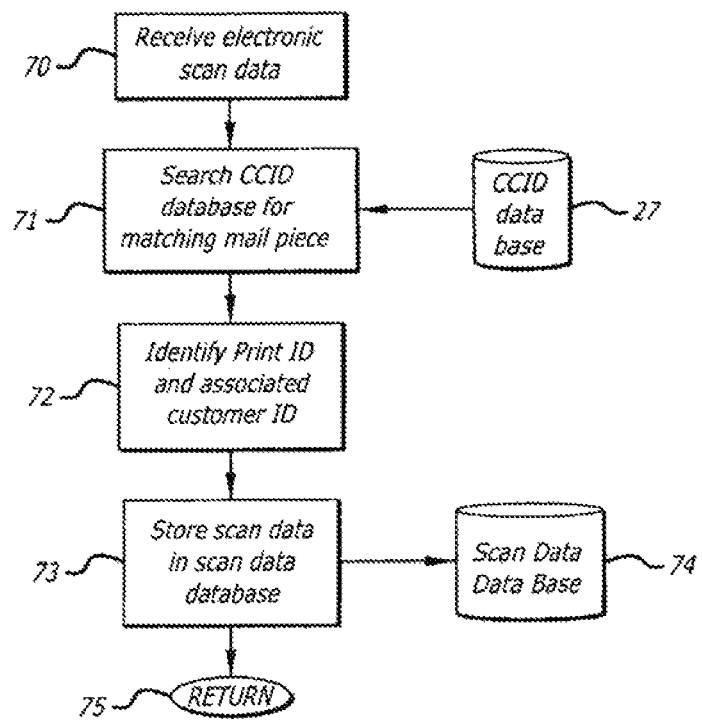
FIG. 4 is a high level logic flow diagram depicting an exemplary process for processing electronic scan data in an exemplary embodiment of the present invention.

FIG. 4 is a high level logic flow diagram depicting an exemplary process for processing electronic scanned CONFIRM® data in an exemplary embodiment of the present invention. As depicted in FIG. 4, an exemplary embodiment system would receive 70 the electronic scanned CONFIRM® data from the U.S. Postal Service in one of the available ways. When an exemplary embodiment system receives electronic scanned CONFIRM® records, for each received electronic scanned CONFIRM® record, the system searches 71 the CCID database 27 to identify a non-expired CCID record matching the Shipment ID of the scanned CONFIRM® record. When an exemplary embodiment system identifies a non-expired CCID record matching the Shipment ID of a particular scanned CONFIRM® record, the system identifies 72 the Print ID, and the correlating customer mailer ID, associated with the CCID record. The system then stores 73 the electronic scan CONFIRM® record, and associated Print ID and customer mailer ID information, in a Scan Data database 74 before returning 75 to other system processing.

It will be understood by someone with ordinary skill in the art that the databases identified herein and the database data relationships described herein could be configured in various ways; that the non-limiting exemplary databases identified and their configurations are provided for non-limiting illustrative purposes.

An exemplary system can report the scan data for a particular customer's mail piece in various ways. An exemplary system will ask the user before the time that the CCID mail piece tracking label is printed how the user wants to receive information about the mail piece status during processing and at delivery. Among other ways, an exemplary system will provide mail piece tracking status reporting via the following non-limiting exemplary types of reports: on a website, via email to the receiver and/or the sender, via a look-up from a print history of the Internet-based postage system, email notification of expected delivery, wireless notification of expected delivery, and phone look-up.

Figure 5:
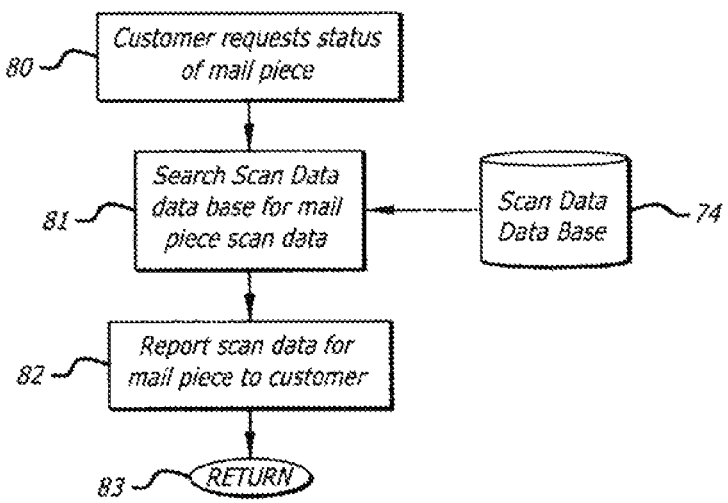
FIG. 5 is a high level logic flow diagram depicting an exemplary process for reporting mail piece tracking information to a customer.

FIG. 5 is a high level logic flow diagram depicting an exemplary process for reporting mail piece tracking information to a customer. As depicted in FIG. 5, when a customer requests 80 status of a particular mail piece, the system will search 81 the scan data database 74 for information about the particular mail piece. When the system locates information about the particular mail piece, the system will report 82 the mail piece status to the customer before returning 83 to other system processing. In an exemplary embodiment, the system will report all scan data received for that particular mail piece.

In addition to customer-based reporting, the system will also provide system-wide reporting, including, by non-limiting example: mass mailing reports of everything in the system, facility problem reports, reports of items that have never been scanned, reports of items that were scanned at least once, but have disappeared, average delivery time of mail pieces, average delivery time by region, and average delivery time by mail service class.

Figure 6:
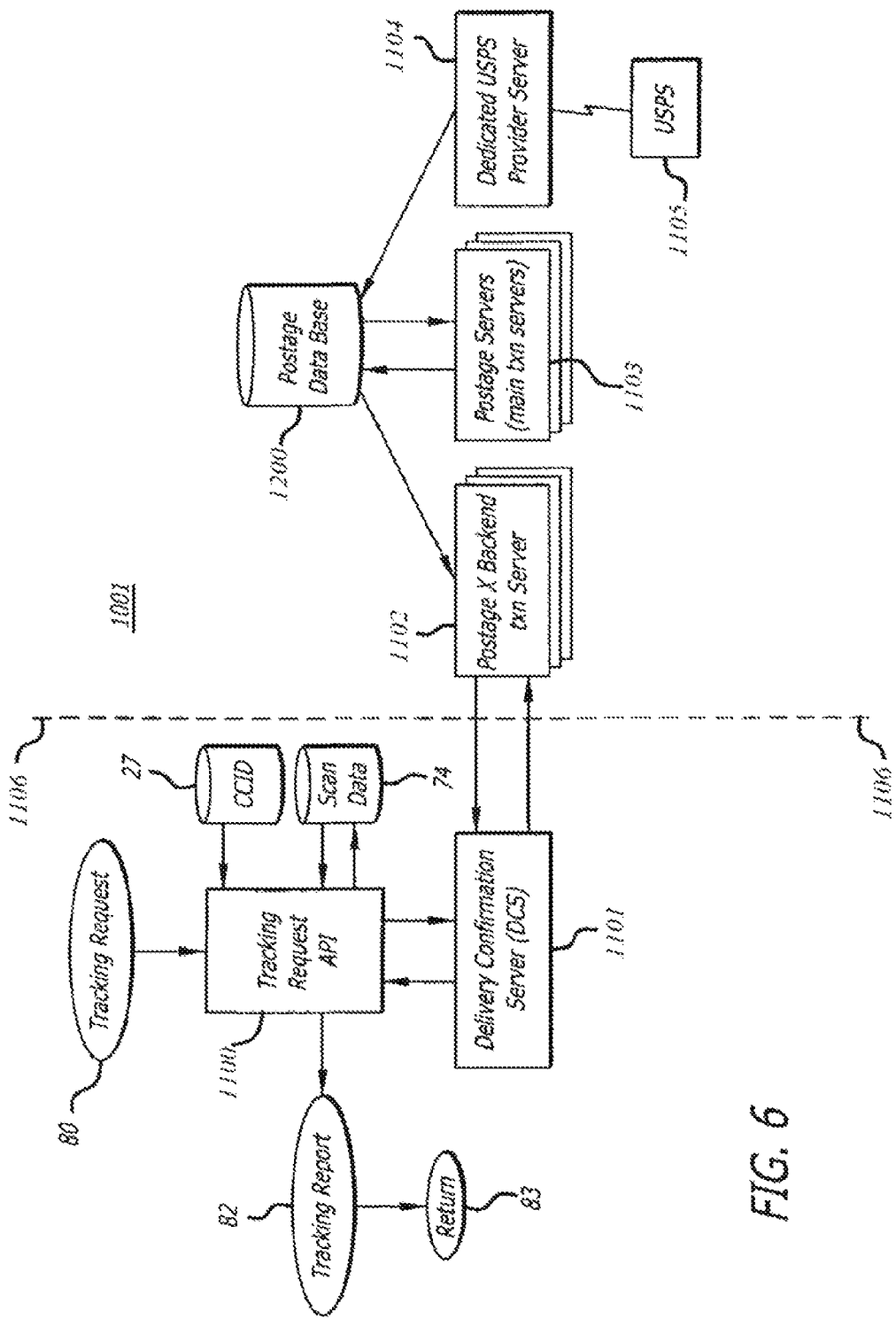
FIG. 6 is a block diagram depicting an exemplary configuration of server computers and a tracking applications program interface for facilitating tracking of mail pieces in an exemplary embodiment of the present invention.

FIG. 6 is a block diagram depicting an exemplary configuration of server computers and a tracking applications program interface for facilitating tracking of mail pieces in an exemplary embodiment of the present invention. FIG. 6 depicts, in a server environment context, an exemplary system configuration for processing mail piece tracking information and for reporting that information to a customer based on a specific tracking request.

As depicted in FIG. 6, one to a plurality of postal server computers 1103 are provided. The postal server computers 1103 serve as main transaction servers for the postal system 1001 (the system to the left of the dotted line 1106-1106). The postal server computers 1103 access the postal database 1200. The postal database 1200 contains, among other things, information about each registered postal meter, registration information for each customer to which each respective postal meter is registered, CONFIRM® scan events, CONFIRM® exceptions, CONFIRM® fraud detection statistics, refund information, and other types of information. A dedicated USPS Provider Server 1104 is provided for accessing a USPS system 1105 provided by the USPS.

As depicted in FIG. 6, one to a plurality of postal X server computers 1102 are provided. The postal X server computers 1102 serve as backend transaction servers. The postal X server computers 1102 respond to requests from transaction-specific type servers, such as a Delivery Confirmation Server 1101.

The Delivery Confirmation Server 1101 provides a tracking request Application Program Interface (API) 1100. The tracking request API 1100 is a program interface that receives and processes API requests comprising electronic objects of a particular type. Herein, reference to an API Server, or to API Servers, refers to one or more server computers that are programmed to perform various activities comprising particular API functions, including but not limited to receiving and translating various types of API requests and composing and transmitting various types of API responses to the appropriate party's system.

In an exemplary embodiment of the invention, the tracking request API 1100 retrieves and processes tracking API requests in the form of XML (Extensible Markup Language) documents. XML is a markup language for electronic documents. A mark up language such as XML uses certain defined delimiters and tag names to designate meaning and/or organization of marked text within an electronic document.

As depicted in FIG. 6, an exemplary system Tracking Request Applications Program Interface (API) 1100 would process mail piece scan data, and would store mail piece scan data on the scan data database 74. The Tracking Request API 1100 would respond to tracking requests 80 input by a user with a report of mail piece tracking events.

Notably, though, the USPS may sometimes miss scanning the CONFIRM® barcode on a mail piece. For example, a CONFIRM® barcoded mail piece may fail to be scanned due to equipment problems.

In view of the failure by the USPS to sometimes scan CONFIRM® barcoded mail pieces, an alternative exemplary embodiment of the present invention would combine tracking based on CONFIRM® CCID barcoded mail piece scans with tracking of scanned computer-based postage indicia, such as tracking of scanned computer-based IBI Lite postage indicia.

As previously described above, in addition to identifying a relationship between the above-described unique (or substantially unique, or relatively unique) tracking CCID for a particular mail piece, the alternative exemplary embodiment of the present invention would identify a relationship between the postage indicia for the particular mail piece, such as the computer-based IBI Lite postage indicia, and the CCID and Print ID for the particular mail piece.

Such an alternative exemplary embodiment of the present invention would receive and/or retrieve data sets from the USPS of CONFIRM® CCID barcoded mail piece scans as described above and would also receive and/or retrieve data sets from the USPS of scanned computer-based postage indicia, such as, for example, scanned, computer-based IBI postage indicia.

In particular, in an alternative exemplary embodiment of the present invention, data sets of, or other ways of communicating, scanned "IBI Lite" computer-based postage indicia would be received and/or retrieved. In the past, USPS scans of computer-based postage indicia have sometimes been done randomly. However, the randomness of USPS scans of computer-based postage indicia is illustrative and is not a limitation of the present invention. In the future, more frequent scans by the USPS could be possible.

As will be understood by someone with ordinary skill in the art, information about electronically read, or otherwise sensed, indicia may be communicated in various ways. For example, the USPS may scan computer-based postage indicia and then send data sets of scanned computer-based postage indicia data, either encoded or decoded, to the corresponding provider of the computer-based postage indicia for validation. Or the USPS could send data sets of scanned images to the corresponding provider. Alternatively, the USPS could send the corresponding provider an email message with a link to a particular Internet address or other location where data regarding scanned computer-based postage indicia could be accessed. The above-mentioned ways of communicating information about electronically read or sensed postage indicia are illustrative and not a limitation of the present invention.

Figure 8:
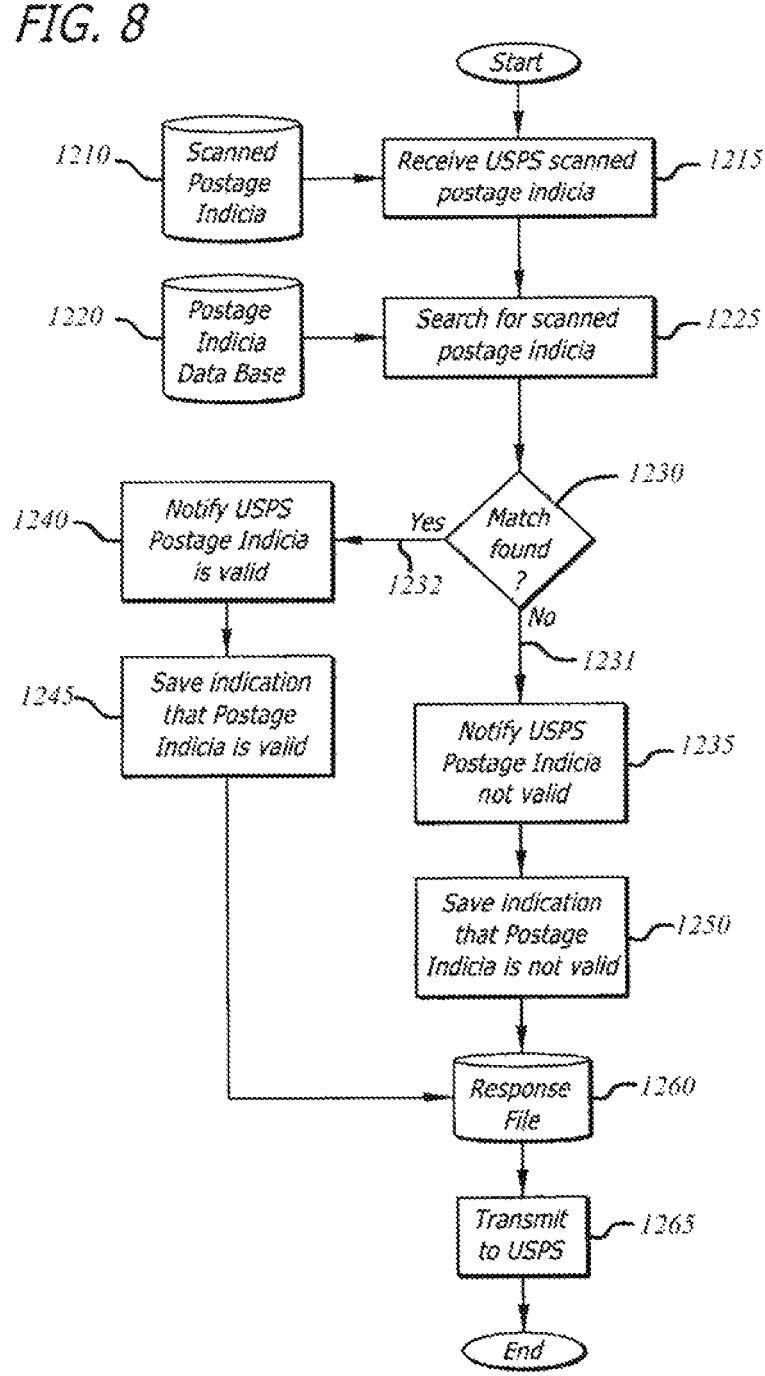
FIG. 8 is a high level flow diagram depicting exemplary high level logic functions for exemplary computer-based postage indicia data validation.

FIG. 8 is a high level flow diagram depicting exemplary high level logic functions for exemplary computer-based postage indicia validation. As depicted in FIG. 8, when in an exemplary embodiment, the USPS sends exemplary data records of scanned postage indicia to a computer-based postage indicia provider, the computer-based postage indicia provider receives 1215 scanned computer-based postage indicia data 1210 from the USPS and searches 1225 a postage indicia data base 1220 for the corresponding full, digitally-signed generic Internet postage indicia data to provide the USPS with a response as to the validity or non-validity of the scanned data. The search results are tested to see if a match was found 1230.

If a match for the scanned computer-based postage indicia is found 1232, the computer-based postage indicia provider notifies 1240 the USPS that the scanned computer-based postage indicia is valid. For example, as depicted in FIG. 8, an indication (for example, a "yes" or a "1" or a "Valid" or a "+" or other positive indication) is saved 1245 on a response file 1260 to indicate that the scanned computer-based postage indicia is valid.

If, on the other hand, a match for the scanned computer-based postage indicia is not found 1231, the computer-based postage indicia provider notifies 1235 the USPS that the scanned computer-based postage indicia is not valid. For example, as depicted in FIG. 8, an indication (for example, a "no" or a "0" or a "not valid" or a "−" or other negative indication) is saved 1250 on the response file 1260 to indicate that the scanned computer-based postage indicia is not valid.

The response file 1260 is transmitted 1265 (or otherwise provided or made available) to the USPS.

As will be understood by someone with ordinary skill in the art, there are various ways for a provider to communicate validity of electronically read or sensed postage indicia to the USPS and that the description herein of transmitting (as depicted in element 1265 of FIG. 8) a response file is illustrative and not a limitation of the present invention. Alternative ways could include, for example, posting validity of scanned information in a record at an Internet or other address, sending the USPS a link for access by the USPS where scanned postage indicia validity is posted, or other ways.

In an alternative exemplary embodiment of the present invention that includes in the CCID record an indication (either direct or indirect) of postage indicia, an exemplary system would be programmed to save the scanned postage indicia, such as, for example, the scanned IBI Lite postage indicia data and corresponding indicia scanning event data, in an alternative exemplary Tracking database 350.

Figure 9:
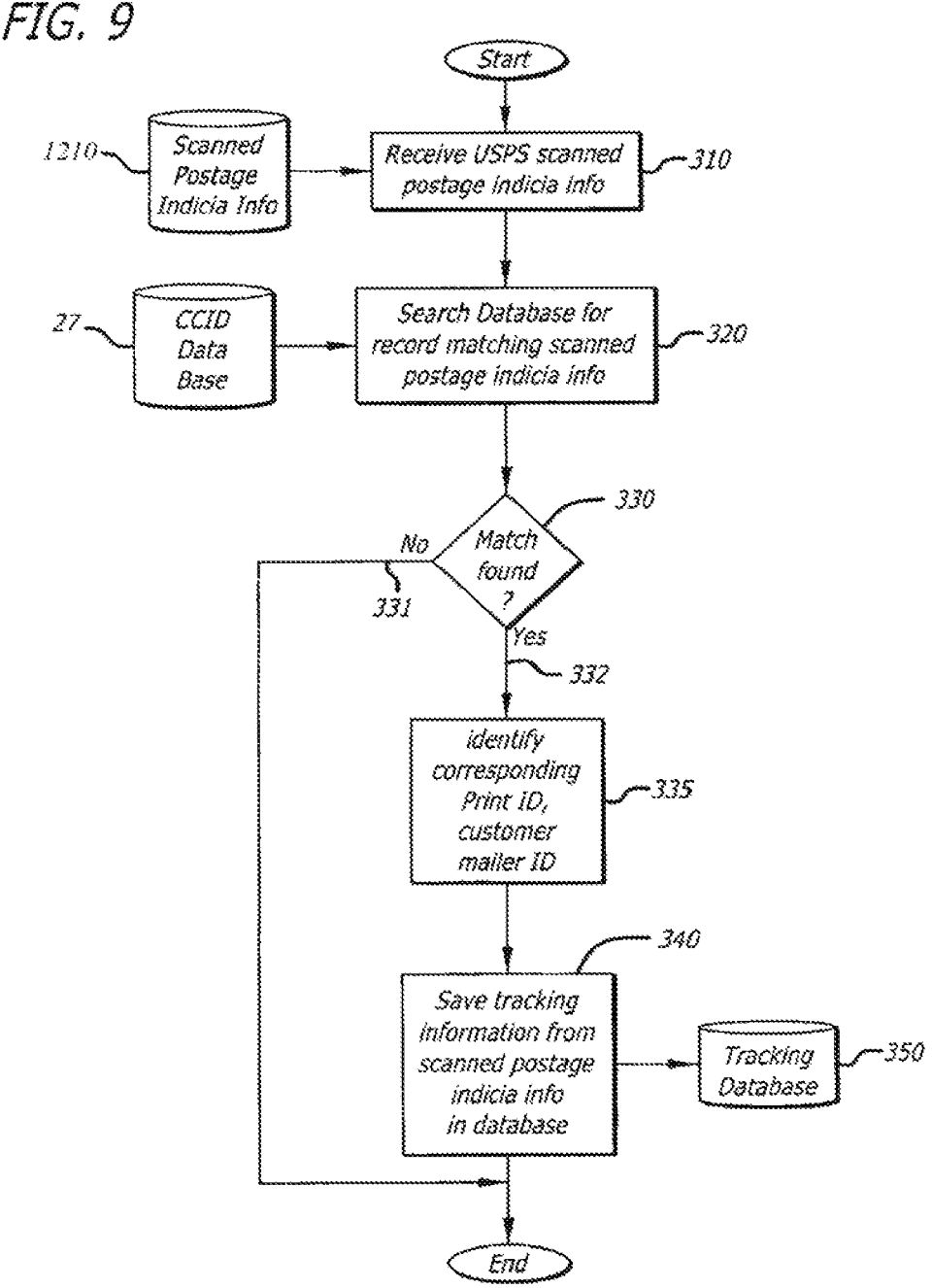
FIG. 9 is a high level flow diagram depicting exemplary high level logic functions for exemplary processing of tracking information from scanned computer-based postage indicia information in the alternative exemplary embodiment of the present invention.

FIG. 9 is a high level flow diagram depicting exemplary high level logic functions for exemplary processing of tracking information from scanned computer-based postage indicia information in an alternative exemplary embodiment of the present invention. As depicted in FIG. 9, the alternative exemplary embodiment system would receive 310 the electronic scanned computer-based postage indicia information 1210 from the U.S. Postal Service in one of the available ways. When the alternative exemplary embodiment system receives electronic scanned computer-based postage indicia information 1210, for each received electronic scanned computer-based postage indicia record in the scanned computer-based postage indicia information 1210, the system would search 320 the CCID database 27 for a non-expired CCID record matching the scanned computer-based postage indicia data. The search results would be tested 330. If the alternative exemplary embodiment system identifies (Yes path 332) a non-expired CCID record matching the particular scanned computer-based postage indicia data in the particular received electronic scanned computer-based postage indicia record, the alternative exemplary embodiment would identify 335 the corresponding Print ID, and the corresponding customer mailer ID, associated with the corresponding CCID record, and would save 340 the tracking information from the scanned postage indicia record in an exemplary Tracking database 350 with the associated CCID record data, such as the Print ID, customer mailer ID information, and corresponding computer-based postage indicia data.

Figure 10:
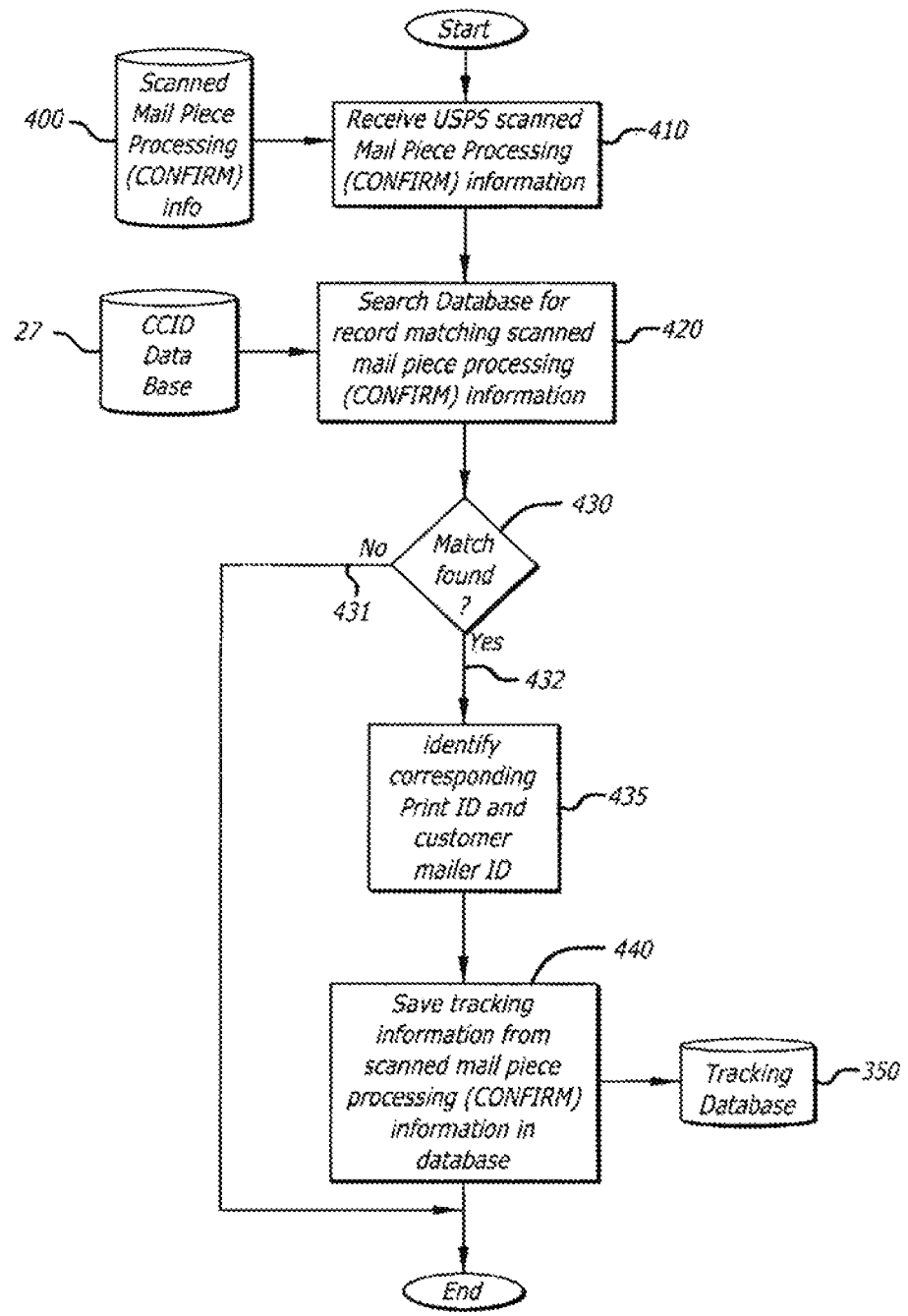
FIG. 10 is a high level flow diagram depicting exemplary high level logic functions for exemplary processing of tracking information from scanned mail piece processing (CONFIRM®) information in the alternative exemplary embodiment of the present invention.

FIG. 10 is a high level flow diagram depicting exemplary high level logic functions for exemplary processing of tracking information from scanned mail piece processing (CONFIRM®) information in an alternative exemplary embodiment of the present invention. As depicted in FIG. 10, the alternative exemplary embodiment system would receive 410 the electronic scanned mail piece processing (CONFIRM®) information 400 from the U.S. Postal Service in one of the available ways. When the alternative exemplary embodiment system receives electronic scanned mail piece processing (CONFIRM®) information 400, for each received electronic scanned mail piece processing (CONFIRM®) record in the scanned mail piece processing (CONFIRM®) information 400, the system would search 420 the CCID database 27 for a non-expired CCID record matching the mail piece identifier in the mail piece processing (CONFIRM®) record. The search results would be tested 430. If the alternative exemplary embodiment system identifies (Yes path 432) a non-expired CCID record matching the mail piece identifier in the mail piece processing (CONFIRM®) record, the alternative exemplary embodiment would identify 435 the corresponding Print ID, and the corresponding customer mailer ID, associated with the corresponding CCID record, and would save 440 the tracking information from the scanned mail piece processing (CONFIRM®) record in the exemplary Tracking database 350 with the associated CCID record data, such as the Print ID, customer mailer ID information, and corresponding computer-based postage indicia data.

It will be understood by someone with ordinary skill in the art that the description of exemplary Tracking database 350 is illustrative and non-limiting. It will be understood that the tracking information described above as being saved on exemplary Tracking database 350 could be saved on more than one memory storage device or on more than one database. For example, the tracking information from the scanned mail piece processing (CONFIRM) record could be saved in the exemplary Scan data database 74 previously described above with respect to FIG. 4; the tracking information from the scanned postage indicia record could be saved in a separate database, such as in the exemplary Tracking database 350 depicted in FIG. 9; when tracking information is requested by a user or otherwise needed by the system for tracking reports, an alternative exemplary embodiment of the present invention would search both the exemplary Scan data database 74 and the exemplary Tracking database 350, and would provide information from both databases if a match is found.

Further, it will be understood by someone with ordinary skill in the art that the above description of two separate flows for saving tracking information from scanned computer-based postage indicia information 1210 as depicted in FIG. 9 and from scanned mail piece processing (CONFIRM) information 400 as depicted in FIG. 10, is illustrative and non-limiting. In other embodiments, the saving of tracking information from the two sources (i.e., from scanned computer-based postage indicia information 1210 as depicted in FIG. 9 and from scanned mail piece processing (CONFIRM) information 400 as depicted in FIG. 10) could be combined in a single logic flow.

For example, in such a combined flow embodiment, system would be programmed to receive a first record of scanned mail piece processing information comprising a scanned mail piece identifier; receive a second record of scanned postage indicia information comprising a scanned set of postage indicia data; and search the computer-accessible memory, such as the Tracking Database 350, for a matching CCID index record comprising at least one of: a set of postage indicia data matching the scanned set of postage indicia data, and a mail piece identifier matching the scanned mail piece identifier.

In such a combined embodiment, for a matching CCID index record for the particular mail piece: if, according to the matching CCID index record, the first record of scanned mail piece processing information comprises a scanned mail piece identifier for the particular mail piece, the embodiment would obtain a first set of tracking information from the first record, and would save the first set of tracking information in a first tracking association with the matching index record. In such a combined embodiment, for a matching CCID index record for the particular mail piece: if, according to the matching index record, the second record of scanned postage indicia information comprises a scanned set of postage indicia for the particular mail piece, the embodiment would obtain a second set of tracking information from the second record, and would save the second set of tracking information in a second tracking association with the matching index record.

Such a combined embodiment would be programmed to receive a tracking request from a customer mailer that would comprise an identifier for the particular mail piece; and would be programmed to display to the customer mailer, tracking information comprising at least one of the first set of tracking information and the second set of tracking information.

FIG. 11 is a high level flow diagram depicting exemplary high level logic functions for exemplary mail piece tracking in an alternative exemplary embodiment of the present invention. As depicted in FIG. 11, an exemplary system of the alternative exemplary embodiment would receive 520 a tracking request 510 (for example, a customer mailer request) for tracking of a particular mail piece, such as in one of the ways previously described above. An exemplary system of the alternative exemplary embodiment would be programmed to search 530 the exemplary Tracking database 350 for any and all tracking information that may exist for the relevant mail piece, including both CONFIRM® scan event records and computer-based postage indicia scanning event records. The search results would be tested 540. If any tracking information was found 542 for the particular mail piece, for all such tracking information found for the relevant mail piece, the system would then be programmed to format 550 a tracking report 560.

It will be understood by someone with ordinary skill in the art that such a tracking report 560 may be in any electronic or hardcopy form, whether now known or in the future discovered, such as, by way of a non-limiting example, a tracking webpage, that displays information for all scanned events, including both CONFIRM® scan events and computer-based postage indicia scanning events, for the particular mail piece.

In an exemplary INTELLIGENT MAIL® Barcode embodiment of the present invention (described further below), scanned events would include INTELLIGENT MAIL® Barcode scan events and computer-based postage indicia scanning events, for the particular mail piece.

The tracking report 560 would be provided 570 to the requestor, such as to a requesting customer mailer. It will be understood by someone with ordinary skill in the art that providing 570 such a tracking report 560 to the requestor may comprise generating a report to be printed on a printing device such as a printing device in communication with a mailing customer's computer. Or, providing 570 such a tracking report 560 to the requestor may comprise generating a webpage and providing the webpage to the web browser software operating on the mailing customer's computer. The above examples are illustrative and non-limiting.

One exemplary embodiment would sort all of the available scanning events for a particular mail piece in chronological date and time order and would provide a report of all of the available scanning events for the particular mail piece in chronological date and time order.

In an alternative exemplary embodiment, after sorting all of the available scanning events for a particular mail piece, a tracking report would be provided that would identify the most recent scanning event.

In an alternative exemplary embodiment of the present invention, the system would be programmed to facilitate input by a customer mailer of a serial number or other identifier associated with the postage label associated with a particular mail piece in order to request tracking. In one such embodiment, an exemplary system would be programmed to provide an exemplary Mail Piece Tracking input screen 601 such as illustratively depicted in FIG. 12. As depicted in FIG. 12, in one such embodiment, an exemplary system would be programmed to allow the customer mailer to key in the serial number of, or other identifier associated with, the postage label associated with the particular mail piece in a serial number (or other identifier) tracking request input field 610 such as illustratively depicted in FIG. 12.

In one such embodiment, the exemplary system would be further programmed to allow the customer mailer to select a postage label record, such as, for example, an entry in a list of printed postage as depicted in FIG. 13. As depicted in FIG. 13, one embodiment would provide a Mailing History screen 620 that would present a list of printed postage. For each entry in the list, an exemplary tracking selection indicator 630 would be provided. If a user checked the exemplary tracking selection indicator 630, the embodiment would process the request such as was described above with respect to the exemplary high level logic functions for exemplary mail piece tracking in an alternative exemplary embodiment of the present invention depicted in FIG. 11 and previously described above.

Continuing with FIG. 13, for illustration purposes, for each printed postage entry in the list, a postage date 640 would be displayed. In the case of date-specific, address-specific postage labels, such as, for example, date 640a, the postage date 640a would represent the date a postage label had been printed and the corresponding mail piece had been mailed. In the case of generic postage, the date, such as for example, date 640b, would represent the date the generic postage label had been printed.

Continuing with FIG. 13, for illustration purposes, for each printed postage entry in the list, a description 650/651 would be provided. In the case of date-specific, address-specific postage labels, an "Addressed to:" 650a type of description would be provided, and the party/address to which the mail piece had been addressed 651a would be presented. In the case of generic postage, a "Label Serial No." 650b type of description would be provided, and the serial number (or other identifier) 651b of the corresponding label that had been printed would be presented.

Notably, in the case of generic postage (that is, postage that is not specific to any particular recipient or any particular date), the system may not have further identifying information (such as a recipient name or address, or even a date mailed) concerning the corresponding mail piece with which to present the tracking information to the customer mailer. That is why the serial number (e.g., 651b) (or other identifier) would be displayed. Sometimes, for generic postage labels, a customer mailer may indicate a memo description. In such case, descriptive information that had been provided by the customer mailer when the generic postage label was printed could be displayed on the Mailing History listing.

An Exemplary Intelligent Mail® Barcode Embodiment

As will be understood by someone with ordinary skill in the art, 4-State Barcodes may comprise various elements.

As will be understood by someone with ordinary skill in the art, the USPS has sometimes referred to 4-State Barcodes as "4-State Customer Barcodes." As will be understood by someone with ordinary skill in the art, one USPS implementation of 4-State Barcodes is sometimes referred to as INTELLIGENT MAIL® Barcodes.

An INTELLIGENT MAIL® Barcode combines the capabilities of a POSTNET barcode and a PLANET CODE® barcode into a single barcode. An INTELLIGENT MAIL® Barcode is a 65-bar U.S. POSTAL SERVICE™ barcode that can be used to sort and track mail pieces. According to the USPS, an INTELLIGENT MAIL® Barcode can be applied on automation-rate FIRST-CLASS MAIL®, STANDARD MAIL®, periodicals, and Bound Printed Matter letters and flats instead of a POSTNET™ barcode. According to the USPS, an INTELLIGENT MAIL® Barcode can also be used for CONFIRM®, Service.

As with the CONFIRM service, a Mailer Identifier is required for subscribers that want to be able to track or otherwise process mail pieces using INTELLIGENT MAIL® Barcode technology.

According to the USPS, an exemplary INTELLIGENT MAIL® Barcode comprises a 20-digit Tracking Code, comprising, for example, a Barcode Identifier, a Service Type Identifier, a Mailer Identifier, and a Serial Number.

According to the USPS, an exemplary Service Type Identifier for an exemplary INTELLIGENT MAIL® Barcode comprises an identifier that defines the mail class and requested services. For example, a mailer affixing an exemplary INTELLIGENT MAIL® Barcode to a mail piece to qualify for automation discounts, would populate the Service Type Identifier field with "700" for FIRST-CLASS MAIL®, "702" for STANDARD MAIL®, "704" for periodicals, "706" for Bound Printed Matter, or "708" for Business Reply Mail or Qualified Business Reply Mail without any services.

According to the USPS, an exemplary Mailer Identifier for an exemplary INTELLIGENT MAIL® Barcode comprises a 6-digit or 9-digit number that uniquely identifies a mail owner or a mailing agent, as assigned by the U.S. POSTAL SERVICE™.

A mailer can determine the content of a serial number to identify a mail piece. In a case where a 6-digit Mailer Identifier is used, a 9-digit serial number may be used to identify mail pieces. In a case where a 9-digit Mailer Identifier is used, a 6-digit serial number may be used to identify mail pieces. Various serial number techniques may be used, for example, serializing mail pieces, embedding Julian date, embedding a mailing event, using a recipient identifier, using a database ID, using a mailing record ID, or others.

A Routing Code can comprise a 5-digit ZIP Code, a 9-digit ZIP+4 code, or an 11-digit delivery point code.

According to the USPS, an INTELLIGENT MAIL® Barcode further comprises up to an 11-digit Routing Code, comprising, for example, a DELIVERY POINT ZIP CODE™. Using encoder software, the Tracking Code and Routing Code are converted into a 65-character string, and then into a 4-State INTELLIGENT MAIL® Barcode.

In an exemplary INTELLIGENT MAIL® Barcode embodiment of the present invention, a mail piece identifier, similar to the composite confirm Identifier (CCID) described above would be constructed. In an exemplary INTELLIGENT MAIL® Barcode embodiment of the present invention, a mail piece identifier would comprise, for example, a Routing Code, that would be populated, for example, by the exemplary Internet Postage system with the appropriate 5-digit ZIP code, 4-digit area code, and 2-digit delivery address code fields obtained by the Internet Postage system in response to a customer's input of a delivery address.

In an exemplary INTELLIGENT MAIL® Barcode embodiment of the present invention, in order for the mail piece identifier to uniquely (or substantially uniquely, or relatively uniquely) identify a particular mail piece, the mail piece identifier would be unique (or substantially unique, or relatively unique) for a time period that would be at least as long as, or would exceed, the time expected to be required for the mail piece to be delivered, and scanned. In an exemplary INTELLIGENT MAIL® Barcode embodiment of the present invention, the uniqueness (or substantial uniqueness, or relative uniqueness) time period will be set, for example, to 30, 60, 90 days, or for certain types of mail, permanent.

It will be understood by someone with ordinary skill in the art that in an exemplary INTELLIGENT MAIL® Barcode embodiment of the present invention, the mail piece identifier would not need to necessarily include the entire POSTNET Code to uniquely (or substantially uniquely, or relatively uniquely) identify a mail piece. It would be possible to use less than the full POSTNET Code to construct a unique (or substantially unique, or relatively unique) mail piece identifier. For example, 1, 2 or more digits of the POSTNET Code could be used to construct a unique (or substantially unique, or relatively unique) mail piece identifier. The number of digits of the POSTNET Code that would be used in an exemplary INTELLIGENT MAIL® Barcode embodiment of the present invention to construct a unique (or substantially unique, or relatively unique) mail piece identifier would depend on circumstances regarding a particular subscriber and the number of its customers.

An exemplary INTELLIGENT MAIL® Barcode embodiment of the present invention would construct a mail piece identifier in a way similar to the exemplary way described above for constructing an exemplary CCID. For example, in an exemplary INTELLIGENT MAIL® Barcode embodiment of the present invention, an exemplary Internet Postage computer system would access an exemplary database of existing exemplary INTELLIGENT MAIL® Barcode embodiment mail piece identifiers to determine whether or not a particular Routing Code (rather than a POSTNET Code as was tested in exemplary test step 31, FIG. 3A) could be found. If the Routing Code (or in an alternative embodiment, the combination of the Routing Code and mail class/service type code) did not exist in an exemplary INTELLIGENT MAIL® Barcode embodiment mail piece identifier database (similar to the CCID database 27 depicted in FIG. 3A), then an exemplary Internet Postage computer system would use, for example, a first Mailing ID ("000001") as part of the Serial Number field of the exemplary INTELLIGENT MAIL® Barcode mail piece identifier, and a first Mailer ID ("000001") to build a unique (or substantially unique, or relatively unique) exemplary INTELLIGENT MAIL® Barcode embodiment mail piece identifier.

As will be understood by someone with ordinary skill in the art, other ways to construct an INTELLIGENT MAIL® Barcode embodiment mail piece identifier could be used without departing from the spirit of the present invention.

As will be further understood by someone with ordinary skill in the art, an exemplary INTELLIGENT MAIL® Barcode embodiment of the present invention could use the previously above-described way of building an exemplary set of computer-based derivative postage indicia data (some embodiments of which are sometimes referred to as "IBI Lite" postage indicia) and mapping (indexing/cross-referencing or otherwise creating an indication of a relationship between) the exemplary set of computer-based derivative postage indicia data to the corresponding exemplary set of full, digitally-signed, generic, computer-based postage indicia data.

Such an exemplary INTELLIGENT MAIL® Barcode embodiment of the present invention could then use the combination of scanned, or otherwise sensed, INTELLIGENT MAIL® Barcode and/or IBI Lite information received or otherwise made available regarding processed mail pieces to track or otherwise process information regarding such mail pieces.

An Exemplary Refund Processing Embodiment

Exemplary embodiments described above would analyze information regarding scanned events concerning CONFIRM® or INTELLIGENT MAIL® Barcode, and/or IBI Lite information, to, for example, track mail pieces and report tracking status of mail pieces to interested users. However, it will be understood by someone with ordinary skill in the art that the above-described type of scanned event analysis would be useful for other types of mail piece processing. For example, as described further below, the above-described type of scanned event analysis would also be useful for an Internet postage provider to obtain refunds from the USPS.

In an exemplary refund embodiment, a user of an exemplary online Internet postage provider system could request a refund for a particular postage label. For example, a postage label may be misprinted.

In an exemplary refund embodiment, the exemplary online Internet postage provider would track each refund request made by a user. With reference to FIG. 16, when the user requests a refund, the exemplary online Internet postage provider would receive the refund request 1601 and check, as depicted in exemplary test function 1602, the user's refund history, as depicted in exemplary user database 1604. If the user's refund history did not indicate abusive practices regarding refund requests (the "No" path from exemplary test function 1602), in an exemplary refund embodiment, the exemplary online Internet postage provider would, in exemplary process 1605, credit a refund for the postage to the user's account, such as in the exemplary user database 1604, and would then proceed to process the refund to the user for potential refund from the USPS; during a processing period of time, the refunded amount would be assigned a "hold" status (see exemplary process 1605) in the user's account (as depicted in exemplary user database 1604), in case it might, as described further below, be determined that a mail piece eventually entered the mail stream bearing a label with the postage indicia and/or mailing identifier associated with the mail piece for which the refund had been issued.

In an exemplary refund embodiment, if a user had a history of abusive refund requests (the "Yes" path from exemplary test function 1602), then the exemplary online Internet postage provider system would refuse to provide an automatic refund to the user as depicted in exemplary process 1603.

In an exemplary refund embodiment, once a refund to a user issued, the exemplary online Internet postage provider system would mark, such as in exemplary process 1605, such as by setting an indicator for the CCID or mail piece identifier, and the IBI Lite postage associated with the mail piece, such as in an exemplary Postage Database 1606, to indicate that the printed postage was not valid and that the system should conduct ongoing analysis of scanning events for a set period of time, for example, 30 days, 60 days, 90 days, or other time period, such as relative to the print date of the refunded postage.

During the set time period, the exemplary online Internet postage provider system would then analyze, such as depicted in exemplary process 1607, all scanning event information (such as depicted in exemplary Scanning Events file 1612; including, for example CONFIRM® and/or INTELLIGENT MAIL® Barcode scan events, and/or IBI Lite scan events), in order to determine if a match could be found (see exemplary test function 1608) for the particular mail piece associated with the CONFIRM® or INTELLIGENT MAIL® Barcode information, or the IBI Lite indicia, corresponding to the refunded postage amount, as depicted in exemplary Postage Database 1606. That is, an exemplary system would attempt to determine whether or not a mail piece bearing the postage label for which a refund had been issued to the requesting user, entered the mail stream.

In an exemplary refund embodiment, if no match for the particular mail piece were found in any of the scan events during the set period of time (the "No" path from exemplary test function 1608), then the exemplary online Internet postage provider system would, in exemplary process 1610, construct and send an automatic request to the U.S. Postal Service, for a refund to the exemplary online Internet postage provider; the exemplary refund request to the USPS in the exemplary refund embodiment would include a report of the scan analysis; the exemplary online Internet postage provider system would, in exemplary process 1609, remove the "hold" status from the refunded amount in the user's account and would update the user's refund history in the exemplary user database 1604 to reflect a successful refund request.

If, on the other hand, a match for the refunded postage indicia were found in some scan event during the set period of time (the "Yes" path from exemplary test function 1608), then, in exemplary process 1611, the exemplary online Internet postage provider system would deduct the refunded amount, that had been set to "hold," from the user's account, would report (see exemplary report 1613) to the Postal Service an invalid IBI Lite associated with the printed postage indicia, and the user's refund history as depicted in the exemplary user database 1604 would be updated to reflect an unsuccessful refund request.

That is, if a mail piece entered the mail stream bearing the postage label for which a refund had been issued to the requesting user, the amount that had been refunded to the user would be recovered by the postage provider and the user's history would reflect an abuse of the refund process.

The above-described exemplary refund process is illustrative and non-limiting. It will be understood by someone with ordinary skill in the art that variations in the refund process could be implemented without departing from the spirit of the present invention. For example, in alternative embodiments, the user refund could be automatic, and even if the refunded mail piece label were later detected to have entered the mail stream, the exemplary online Internet postage provider system would not deduct the previously refunded amount from the user's account in order to recover the previously refunded amount.

TRADEMARKS

CONFIRM®, PRIORITY MAIL®, STANDARD MAIL®, FIRST-CLASS MAIL®, PLANET CODE®, and INTELLIGENT MAIL® are registered trademarks of the United States Postal Service. PLANET™ and associated logos are trademarks of the United States Postal Service. The names of actual companies and products mentioned herein may be the trademarks of their respective owners.

FACSIMILE REPRODUCTION OF COPYRIGHT MATERIAL

A portion of the disclosure of this patent document contains material which is subject to copyright protection by the copyright owner, Stamps.com Inc., its successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
    a memory; and
    one or more processors communicatively coupled to the memory and configured to:
        display, via a user interface application executed by the one or more processors, unprotected content within a page displayed by the user interface application to a user of the user interface application, wherein the unprotected content corresponds to executable code for accessing protected content from a remote server;
        receive, via the user interface application, a print command for printing the protected content, wherein the print command is initiated by the user activating a button included within the page that is configured to facilitate printing of the protected content; and
        control printing, via the user interface application in response to the print command, of the protected content, wherein the one or more processors configured to control printing are configured to:
            execute the executable code to replace at least a portion of the unprotected content with the protected content within the page displayed by the user interface application; and
            immediately invoke printing functionality after replacing the at least a portion of the unprotected content with the protected content causing the protected content to be output to a printer and the protected content to be replaced with unprotected content within the user interface application.

2. The system of claim 1, wherein the protected content comprises postage indicia data.

3. The system of claim 2, wherein a digital signature is associated with the postage indicia data, the digital signature being stored for subsequent validation of the postage indicia data, and wherein the printing functionality prints a graphical representation of the postage indicia data, wherein the graphical representation of the postage indicia data comprises a representation of the postage indicia data and a representation of the digital signature.

4. The system of claim 1, wherein the one or more processors configured to replace the at least a portion of the unprotected content are configured to replace a source of the at least a portion of the unprotected content with a source of the protected content to thereby obtain the protected content from the remote server.

5. The system of claim 1, wherein the protected content is displayed within the page displayed by the user interface application in response to replacing the at least a portion of the unprotected content with the protected content, wherein the unprotected content is displayed within the page displayed by the user interface application in response to the replacing the protected content with the unprotected content, and wherein a duration in which the protected content is displayed within the page displayed by the user interface application corresponds to an amount of time to output the protected content to the printer.

6. The system of claim 1, wherein the user interface application comprises a web browser application, and wherein the executable code is configured to execute a native print functionality of the web browser application after replacing the at least a portion of the unprotected content with the protected content to output the protected content from the web browser application to the printer.

* * * * *